US010506515B2

United States Patent
Garcia et al.

(10) Patent No.: US 10,506,515 B2
(45) Date of Patent: Dec. 10, 2019

(54) PROVISIONING SATELLITE COVERAGE

(71) Applicant: Aireon LLC, McLean, VA (US)

(72) Inventors: Michael A. Garcia, Ashburn, VA (US); Boris Veytsman, McLean, VA (US); Jay Minnix, McLean, VA (US)

(73) Assignee: Aireon LLC, McLean, VA (US)

( * ) Notice: Subject to any disclaimer, the term of this patent is extended or adjusted under 35 U.S.C. 154(b) by 0 days.

(21) Appl. No.: 16/240,949

(22) Filed: Jan. 7, 2019

(65) Prior Publication Data

US 2019/0141637 A1    May 9, 2019

Related U.S. Application Data

(62) Division of application No. 15/462,371, filed on Mar. 17, 2017, now Pat. No. 10,178,624.

(51) Int. Cl.
*H04W 52/02* (2009.01)
*H04B 7/185* (2006.01)
*H04W 72/04* (2009.01)

(52) U.S. Cl.
CPC .... *H04W 52/0258* (2013.01); *H04B 7/18515* (2013.01); *H04B 7/18543* (2013.01); *H04W 72/0446* (2013.01); *Y02D 70/00* (2018.01); *Y02D 70/142* (2018.01); *Y02D 70/164* (2018.01); *Y02D 70/446* (2018.01)

(58) Field of Classification Search
CPC ... H04W 52/02–0296; H04W 52/0258; H04W 72/0446; H04B 7/18515; H04B 7/18543; Y02D 70/00; Y02D 70/142; Y02D 70/164; Y02D 70/446
See application file for complete search history.

(56) References Cited

U.S. PATENT DOCUMENTS

| 4,261,054 | A | * | 4/1981 | Scharla-Nielsen | ................. H04B 7/18543 342/353 |
|---|---|---|---|---|---|
| 5,708,965 | A | * | 1/1998 | Courtney | ........... H04B 7/18539 455/13.4 |
| 5,956,619 | A | * | 9/1999 | Gallagher | ............. H04W 52/40 455/12.1 |
| 6,731,613 | B1 | * | 5/2004 | Provance | ............ H04W 52/343 370/230 |
| 7,047,029 | B1 | | 5/2006 | Godwin et al. | |

(Continued)

*Primary Examiner* — Dung B Huynh
(74) *Attorney, Agent, or Firm* — Baker Botts L.L.P.

(57) ABSTRACT

In one implementation, satellite coverage provisioning for a service area may be performed by updating power consumption states for satellites in a constellation of satellites and determining whether each satellite of the constellation is required to be in the minimal power consumption mode based on its updated power consumption state. For satellites that are not required to be in the minimal power consumption mode, a power consumption score may be calculated and these satellites may be sorted according to their respective power consumption scores. Based on the sorted order, it may be determined whether at least some of these satellites can be put into a reduced power consumption mode based on their respective power consumption scores and coverage of the service area. Then it may be determined if each of the satellites that are in the reduced power consumption mode can be put into the minimal power consumption mode.

20 Claims, 10 Drawing Sheets

(56) References Cited

U.S. PATENT DOCUMENTS

| | | | |
|---|---|---|---|
| 7,392,011 B1* | 6/2008 | Jacomb-Hood | H01Q 1/288 342/368 |
| 8,526,906 B1* | 9/2013 | Oroskar | H04W 52/0277 455/343.1 |
| 9,485,010 B1 | 11/2016 | Chen et al. | |
| 2005/0272365 A1* | 12/2005 | Meirzon | H04B 7/18517 455/3.02 |
| 2006/0182021 A1* | 8/2006 | Kristensen | H04W 52/267 370/229 |
| 2009/0097428 A1* | 4/2009 | Kneckt | H04W 52/0216 370/311 |
| 2010/0202300 A1* | 8/2010 | Rhoads | G01S 5/021 370/252 |
| 2012/0244869 A1 | 9/2012 | Song et al. | |
| 2013/0210408 A1* | 8/2013 | Hohteri | G06F 1/3231 455/418 |
| 2013/0244709 A1* | 9/2013 | Davydov | H04W 72/0413 455/501 |
| 2014/0002293 A1 | 1/2014 | Behrens et al. | |
| 2014/0113544 A1* | 4/2014 | Topping | H04B 7/18543 455/3.01 |
| 2014/0218242 A1* | 8/2014 | Platzer | G01S 5/0027 342/454 |
| 2014/0233442 A1* | 8/2014 | Atias | H04W 52/0206 370/311 |
| 2015/0312867 A1* | 10/2015 | Cui | H04W 52/0206 455/68 |
| 2015/0327079 A1* | 11/2015 | Wu | H04W 16/04 455/562.1 |
| 2016/0014786 A1* | 1/2016 | Chang | H04B 7/2041 370/316 |
| 2016/0081031 A1* | 3/2016 | Barriac | H04W 52/0261 370/311 |
| 2016/0127060 A1* | 5/2016 | Cross | H04B 7/18508 375/211 |
| 2016/0216755 A1* | 7/2016 | Maheshwari | G06F 1/3278 |
| 2016/0295634 A1* | 10/2016 | Miao | H04W 4/70 |
| 2016/0323829 A1* | 11/2016 | Zhang | H04W 52/0225 |
| 2016/0353372 A1* | 12/2016 | Bishop, Jr. | H04W 52/0203 |
| 2017/0013670 A1* | 1/2017 | Cui | H04W 52/0212 |
| 2017/0027017 A1* | 1/2017 | Black | H04B 7/18513 |
| 2017/0041870 A1* | 2/2017 | Chen | H04W 52/02 |
| 2017/0078978 A1* | 3/2017 | Scipione | H04W 52/18 |
| 2017/0086141 A1* | 3/2017 | Gal | H04W 52/0229 |
| 2017/0230104 A1 | 8/2017 | Purkayastha et al. | |
| 2017/0238258 A1* | 8/2017 | Ramalho de Oliveira | H04W 52/0261 455/574 |
| 2017/0353871 A1 | 12/2017 | Tatum | |
| 2018/0026707 A1 | 1/2018 | Sanders | |
| 2018/0192374 A1 | 7/2018 | Jain et al. | |
| 2018/0198516 A1 | 7/2018 | Garcia et al. | |
| 2018/0227041 A1 | 8/2018 | Alminde et al. | |
| 2019/0082442 A1* | 3/2019 | Jin | H04L 5/0048 |

* cited by examiner

PROVISIONING SATELLITE COVERAGE

CROSS-REFERENCE TO RELATED APPLICATION

The present application is a divisional of U.S. patent application Ser. No. 15/462,371, which was filed on Mar. 17, 2017, the disclosure of which is incorporated herein by reference in its entirety.

TECHNICAL FIELD

The present disclosure relates to provisioning satellite coverage.

BACKGROUND

Satellites provide important services in peoples' daily lives, such as communication (e.g., satellite phones), navigation (e.g., Global Positioning System (GPS)), surveillance, weather forecasting/monitoring, to name just a few. In some cases, a satellite service may be provided by a constellation of multiple satellites that collectively cover a desired service area. For example, the ubiquitous GPS service is provided by a constellation of satellites operated by the United States government, which is committed to maintaining the availability of at least 24 operational GPS satellites, 95% of the time. To achieve this goal, the government has been flying 31 operational GPS satellites for the past few years, according to http://www.gps.gov.

Existing satellite scheduling may focus on connection-oriented services, addressing single satellite and single orbit solutions. In addressing this scenario, the scheduling approach can assess one or more feasible sets of requests and then schedule the requests, optimizing the jobs over satellites and times. The scheduling of satellite services can be on a first in first out (FIFO) or priority queue basis, where constraints applied typically include time constraints and on-board resource constraints.

SUMMARY

In one implementation, satellite coverage provisioning for a service area may be performed by updating power consumption states for satellites in a constellation of satellites and determining whether each satellite of the constellation is required to be in the minimal power consumption mode based on its updated power consumption state. For satellites that are not required to be in the minimal power consumption mode, a power consumption score may be calculated, and these satellites may be sorted according to their respective power consumption scores. Based on the sorted order, it may be determined whether at least some of these satellites can be put into a reduced power consumption mode based on the respective power consumption scores and coverage of the service area. Then it may be determined if each of the satellites that are in the reduced power consumption mode can be put into the minimal power consumption mode.

DESCRIPTION OF EXAMPLE IMPLEMENTATIONS

Figure 1:
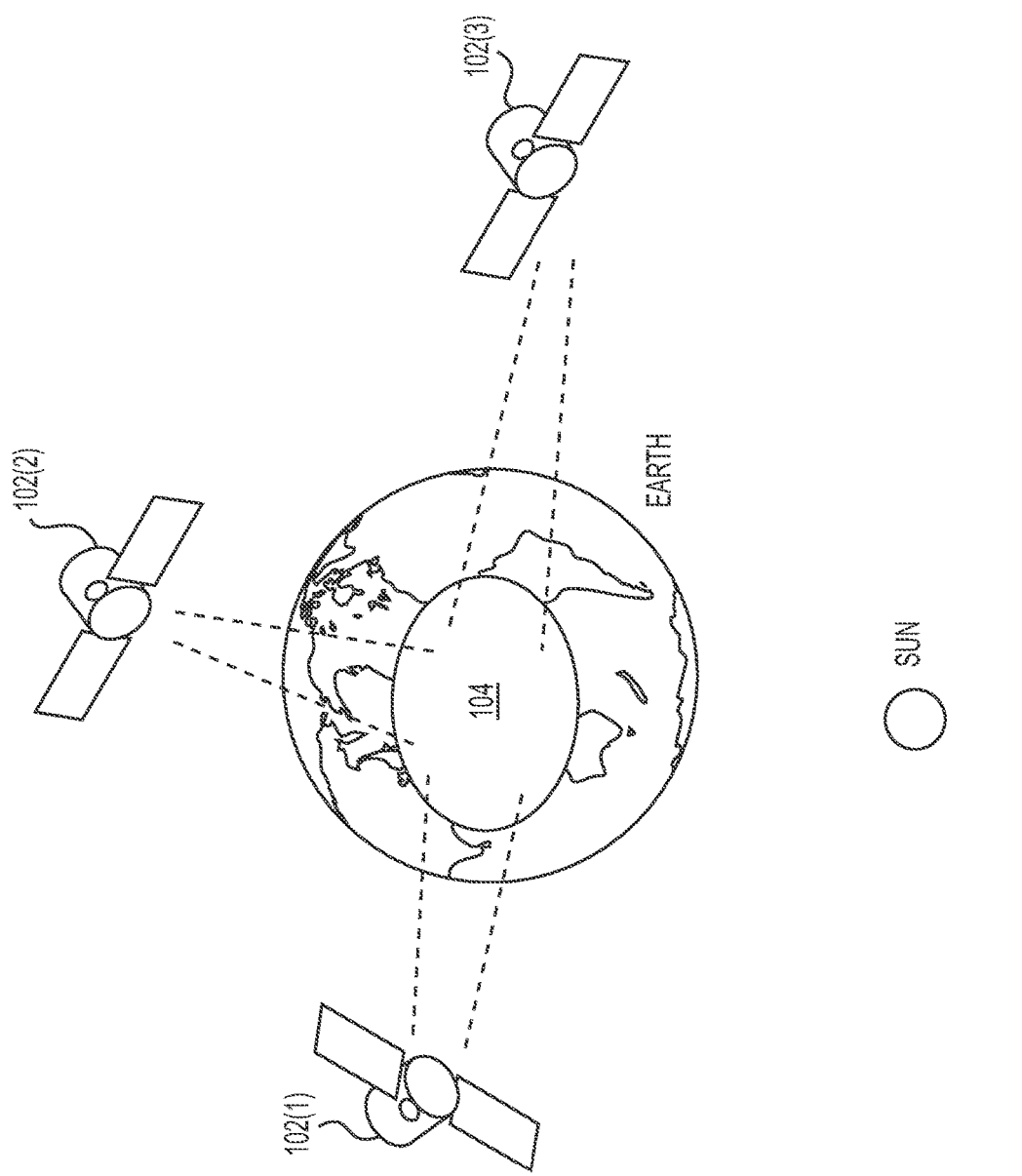
FIG. 1 is a schematic block diagram of a constellation of satellites providing coverage.

The concepts disclosed herein are illustrated through certain implementations and aspects thereof, which are described in detail herein with reference to the accompanying drawings, wherein like reference numerals may refer to like features throughout. It is to be understood, however, that the disclosed concepts are not necessarily limited to the illustrative implementations described below and the following descriptions should be read in such light.

Additionally, the word exemplary may be used herein to refer to an example, instance or illustration. As such, any reference to something as exemplary is not necessarily to be construed as preferred or advantageous over something else.

Additionally, mathematical expressions are contained herein, and those principles conveyed thereby are to be taken as being thoroughly described therewith. It is to be understood that where mathematics are used, such is for succinct description of the underlying principles being explained and, unless otherwise expressed, no other purpose is implied or should be inferred.

The figures described herein include schematic block diagrams illustrating various interoperating functional modules. Such diagrams are not necessarily intended to serve as electrical schematics. As such, interconnections illustrated may depict signal flow, various interoperations between functional components and/or processes, not necessarily direct electrical connections between such components. Moreover, the functionality illustrated and described via separate components need not be distributed as shown, and discrete blocks in the diagrams may not necessarily depict discrete electrical components.

Techniques described herein are directed to the provisioning of satellite coverage, for example, under constraints. In some implementations, the provisioning of satellite coverage may include selecting a subset of less than all satellites (or payloads on board such satellites) from a constellation of satellites to provide service coverage related to information that is not known a priori (e.g., receiving air traffic control surveillance data from aircraft) and/or when the service is not a connection-oriented service. For example, satellite coverage may be provisioned, not necessarily based on a defined set of tasks or connections, but rather to provide a capability and/or coverage to designated service areas, with onboard and system constraints considered. In one particular example, a constellation of satellites includes satellites configured to receive automatic dependent surveillance-broadcast (ADS-B) signals from aircraft flying over the Earth. In some implementations, ADS-B receivers may be implemented within or be part of the primary payload of such satellites. Alternatively, ADS-B receivers may be implemented as so-called secondary payloads hosted on such satellites. In either case, provisioning the ADS-B service coverage provided by the constellation of satellites may include selecting a subset of less than all satellites to provide the desired service coverage during different time periods. This may be particularly useful in implementations where the ADS-B receivers are implemented as hosted payloads subject to certain constraints (e.g., power consumption limits) imposed by the satellites busses, primary payloads, etc. Upon review of this disclosure and appreciation of the concepts disclosed herein, the ordinarily skilled artisan will recognize other service provisioning contexts in which disclosed concepts can be applied. The scope of the present disclosure is intended to encompass all such implementations.

FIG. 1 illustrates a plurality of satellites 102 providing coverage to a service area 104 on Earth. The satellites 102(1), 102(2) and 102(3) may be part of a constellation of satellites, which may comprise tens, hundreds or thousands of satellites depending, for example, on what service(s) are being provided by the constellation and/or the design of the constellation. It should be noted that although the singular word service occasionally may be used in the description herein, in some cases, multiple services may be provided by satellites according to the present disclosure, and, thus, the word service may represent a single service or a plurality of services. In some implementations, an individual satellite 102 may have a single or primary payload configured to provide one or multiple services. For example, an individual satellite may have a primary payload configured to provide a space-based surveillance service. More particularly, an individual satellite may have a primary payload configured to provide a space-based ADS-B service, for example, by receiving ADS-B signals from aircraft equipped with ADS-B avionics transmitting ADS-B messages. In such implementations, the payload may be or include an ADS-B receiver. Alternatively, an individual satellite may have a primary payload configured to provide voice and/or data communication services to terrestrial subscribers. Additionally or alternatively, an individual satellite 102 may have multiple payloads, each of which is configured to provide one or more different services. For example, an individual satellite may have a primary payload configured to provide voice and/or data communication services to terrestrial subscribers and a secondary or hosted payload configured to provide a space-based surveillance service such as, but not limited to, a space-based ADS-B surveillance service for aircraft equipped with ADS-B avionics transmitting ADS-B signals. In such implementations, the secondary or hosted payload may be or include an ADS-B receiver.

In some implementations, the satellites 102 may be part of a constellation of low Earth orbit (LEO) satellites (that may or may not be cross-linked to enable space-based communication between individual satellites within the constellation). In such implementations, the satellites 102 may orbit the Earth at altitudes, for example, between 99 miles and 1,200 miles above the Earth's surface and with orbital periods, for example, between 88 minutes and 127 minutes. The footprint covered by an individual satellite 102 (or payload on board the satellite) may change as the satellite 102 orbits.

In one particular example, the satellites 102 may be arranged into a number of orbital planes (e.g., 6 orbital planes) with an equal (or different) number of satellites in each orbital plane (e.g., 11 satellites per orbital plane) and, furthermore, the satellites 102 may be configured such that collectively the satellites (or payloads on board the satellites) are capable of providing coverage for the entire Earth or nearly the entire Earth. In this and other examples, the satellites 102 may have polar or substantially polar orbits. As the satellites orbit, the footprints that the satellites 102 (or payloads on board the satellites) cover may change. Nevertheless, the collective coverage area that the satellites 102 (or payloads on board the satellites) can provide may remain the same or substantially the same over time (e.g., due to the coordinated arrangement and orbits of all of the satellites). Furthermore, in this example, individual satellites 102 may include a primary payload configured to provide voice and/or data communication services to terrestrial subscribers and a secondary or hosted payload configured to provide a space-based ADS-B surveillance service. As such, satellites 102 collectively may be capable of providing both a global (or nearly global) voice and/or data communications service and a global (or nearly global) space-based ADS-B surveillance service. In such implementations, the provisioning of the voice and/or data communications service may involve selecting a subset of the primary payloads to provide the communications service at different periods of time. Additionally or alternatively, the provisioning of the space-based ADS-B surveillance service may involve selecting a subset of the secondary payloads to provide the space-based ADS-B surveillance service at different periods of time.

The service area 104 may be an area on the Earth's surface and, in some cases, the space above such area on the Earth's surface (e.g., in the case of a space-based ADS-B surveillance service for aircraft). In one implementation, the service area 104 may be delineated into a plurality of unit or sub-areas. For example, the service area may be subdivided into multiple sub-areas of relatively similar area, which may be referred to as tiles. The size of a tile may be defined, for example, based on degrees of latitude and longitude, such as 1 degree latitude and 1 degree longitude, or any number of degrees (or a fraction of a degree) of latitude and any number of degrees (or a fraction of a degree) of longitude that are suitable for the service(s) being provided. In some implementations, the service area 104 may include all of the Earth's surface or substantially all of the Earth's surface. In other implementations, the service area 104 may include only a defined portion of the Earth or there may be multiple segregated service areas around the Earth.

As shown in FIG. 1, multiple satellites 102 (or payloads on board the satellites) may provide coverage for the service area 104 (or portions of the service area 104). In some implementations, the footprints of multiple individual satellites 102 (or payloads on board such satellites) may overlap at least during certain periods of time. In such cases, the region(s) where the satellites' 102 (or payloads') footprints overlap may be covered by multiple satellites 102 (or payloads) concurrently. The number of satellites (or payloads) providing coverage concurrently for one unit area (e.g., a tile) at a defined point in time or during a defined period of time may be referred to as the coverage number for the unit area at or during that time. Implementations of the present disclosure may attempt to provision satellite coverage for an individual unit area in an effort to ensure that the coverage number for the unit area at a defined point or during a defined period of time may be larger than or equal to a specific number required by the service to be provided for the unit area at or during the defined time, which may be referred to as the required coverage number for the unit area at or during the defined time. The required coverage number for a unit area at or during a defined time may be one but may also be a number larger than one. For example, for air traffic control or surveillance, the required coverage number for a particular unit area at or during a defined time may be one specific number (e.g., equal to or larger than one); for weather forecasting, the required coverage number may be another specific number (e.g., equal to or larger than one). Moreover, the service area 104 may be a representative for a plurality of service areas that need to be covered by the satellites 102(1), 102(2) and 102(3) (or payloads on board the satellites).

In addition to service areas, in certain implementations, there may be one or more areas defined as empty areas and one or more areas defined as nuisance areas on Earth. In such implementations, empty areas may not require coverage, but they may be covered with an expectation that there will be substantially no negative effects for covering them. Nuisance areas, meanwhile, similarly may not require coverage and they may have noise sources such that covering them may lower the signal to noise ratio for signals from the service areas received by the satellite(s) 102 (or payload(s)) covering such nuisance areas.

In some implementations, a tile may be referred to as being critically covered if two conditions are true: there are satellites 102 (or payloads on board such satellites)) providing coverage for the tile, and the number of satellites 102 (or payloads on board such satellites) covering the tile is equal to the required coverage number. In such cases, if a satellite 102 (or payload on board the satellite) providing critical coverage of a tile is switched off (e.g., so as to not provide service), the coverage requirement will not be satisfied.

In some implementations, the satellites 102 (or payloads on board the satellites) may be at least partially solar powered. In such implementations, each satellite 102 may have one or more solar panels that collect solar energy when exposed to the Sun. The solar panel(s) may convert the solar energy into electrical energy to support operation of the respective satellites (or payloads on board the satellites). In some implementations, the satellites 102 may include batteries that are capable of storing electrical energy generated by the solar panel(s) for later use by the satellites 102. As illustrated in FIG. 1, as a satellite 102(2) orbits the Earth, there may be periods of time during which the satellite 102(2) may be in a shadow of the Earth and, thus, not in a direct line of sight of the Sun. During such periods, the satellite 102(2) may be referred to as being in eclipse. When a satellite 102 is in eclipse, the solar panels may not generate any electrical energy (e.g., because the eclipse condition prevents the solar panels from receiving solar energy) and the satellite's 102 operation may be solely (or largely) supported by battery or some other alternative energy source and this situation may be taken into consideration as described herein.

Figure 2:
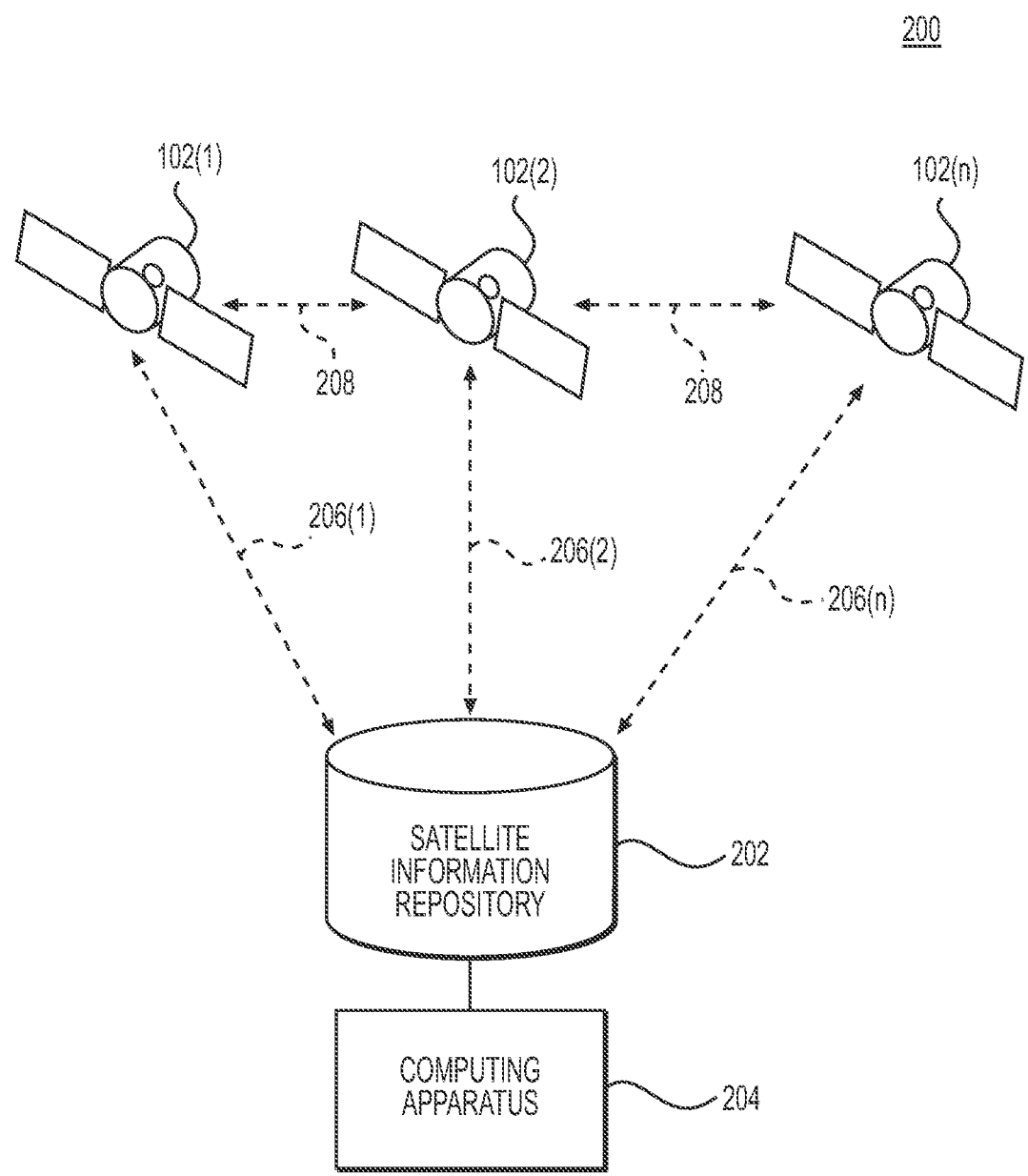
FIG. 2 is a schematic block diagram of a satellite coverage provisioning system.

FIG. 2 illustrates an exemplary system configuration 200 according to an implementation of the present disclosure. As shown in FIG. 2, the system 200 may comprise a constellation of satellites 102 (e.g., 102(1), 102(2), . . . , 102(n), with n being an integer number equal to or larger than three), a satellite information repository 202 and a computing apparatus 204. The satellite information repository 202 may be implemented as computer (or some other form of electronic) storage and may store and/or model information related to the satellites 102 including operational modes, power consumption levels, and ephemeris data (e.g., including orbit and eclipse information) for some or all of the satellites 102 (or payloads on board some or all of the satellites 102) in the constellation. Although shown as separate entities in FIG. 2, the satellite information repository 202 may be part of the computing apparatus 204 in some implementations. Moreover, in some implementations, the satellite information repository 202 may comprise distributed storage such that portions of the information stored therein may be stored across multiple devices, which may be located geographically close (e.g., in the same room or in different buildings of the same campus) or remote (e.g., in different cities, counties, states, continents, etc.). Regardless of whether the satellite information repository 202 is part of the computing apparatus 204, either or both of the satellite information repository 202 and the computing apparatus 204 may be communicatively connected (e.g., either directly or indirectly) to each of the satellites 102; therefore, the computing apparatus 204 may remotely control the satellites 102 (or payloads on board the satellites 102) for provisioning of the satellite service. For example, in some implementations, computing apparatus 204 may represent (separately from or together with satellite information repository 202) a telemetry, tracking and command (TTAC) ground system. In alternative implementations, satellite information repository 202 and computing apparatus 204 may be hosted on or distributed across one or more of satellites 102 such that the provisioning of the satellite service may be wholly or partially controlled by the one or more satellites 102 (or payloads on board the one or more satellites 102). As described in greater detail below, computing apparatus 204 may determine which of several different operational modes each of the satellites 102 (or payloads on board the satellites) should operate in during different periods of time and transmit instructions to individual satellites 102 (or payloads on the individual satellites) instructing the satellites (or payloads) to enter the determined operational modes for the appropriate time periods.

In one particular example, computing apparatus 204 (separately from or together with satellite information repository 202) may represent or be communicatively coupled to a ground station that establishes wireless communications links (e.g., uplinks and/or downlinks) 206 with one or more of satellites 102, for instance via electromagnetic signals (e.g., in the K or $K_a$ band). In this example, as the satellites 102 orbit, individual satellites 102 may go in and out of view of the ground station. Therefore, the ground station may dynamically establish and relinquish communications links 206 with individual satellites 102 as the satellites 102 go in and out of view of the ground station. When a communications link 206 exists between an individual satellite 102 and the ground station, the ground station may transmit control information to the satellite 102 via the communications link 206 for use in provisioning the service. In some cases, such control information may be specific to the individual satellite 102 (or a payload on board the individual satellite 102). In other cases, wireless cross-links 208 (e.g., in the K or $K_a$ band) may communicatively connect individual satellites 102 to each other, and the control information transmitted to a satellite 102 by the ground station may be propagated to one or more or all of the other satellites 102 via the crosslinks 208 for use in provisioning the service.

In one implementation, all satellites 102 (or individual payloads on board all of the satellites 102) in the constellation may be configured to operate within the same set of different modes having the same average (or estimated) power consumption levels as indicated in Table 1 below.

TABLE 1

Power Levels

| Mode | Average Power Consumption (in watts "W") |
|---|---|
| High On | AA |
| Medium On | BB |
| Low On | CC |
| High Idle | XX |
| Low Idle | YY |

In such an implementation, each satellite 102 (or an individual payload on board each satellite 102) may comprise multiple service providing elements. For example, in implementations that provide a surveillance service (e.g., a spaced-based ADS-B surveillance service), the service providing elements may be antennas and/or receivers for receiving ADS-B signals. Additionally or alternatively, the service providing elements may be antennas and/or transmitters or transceivers that are capable of transmitting signals. When a satellite 102 (or individual payload on board a satellite 102) is operated in the "High On" mode, all (or a relatively large number) of the service providing elements on the satellite 102 (or payload on board the satellite 102) may be turned on to provide the coverage and, collectively, these elements may consume power at the average (or estimated) rate of AA W and provide a relatively high level of coverage within the footprint of the satellite (or payload on board the satellite). For example, when operating in the "High On" mode, the satellite (or the payload on board the satellite), may provide a relatively large number of receive and/or transmit beams within the footprint of the satellite (or the payload on the satellite). Consequently, the satellite (or the payload on board the satellite) may provide coverage to a relatively large number of tiles within the footprint of the satellite (or payload on board the satellite) when operating in the "High On" mode.

When a satellite 102 (or individual payload on board a satellite 102) is operated in the "Medium On" mode, a subset of the service providing elements on the satellite 102 (or payload on board the satellite 102) that is less than the service providing elements turned on during the "High On" mode may be turned on to provide the coverage and, collectively, these elements may consume power at the average (or estimated) rate of BB W, which is less than the rate of AA W, and provide a relatively moderate level of coverage within the footprint of the satellite (or payload on board the satellite) that is less than the level of coverage when the satellite (or payload on board the satellite) is operated in the "High On" mode. For example, when operating in the "Medium On" mode, the satellite (or the payload on board the satellite), may provide a relatively moderate number of receive and/or transmit beams within the footprint of the satellite (or the payload on the satellite) that is less than the number of beams that the satellite (or payload on board the satellite) provides when operating in the "High On" mode. Consequently, the satellite (or the payload on board the satellite) may provide coverage to a relatively moderate number of tiles within the footprint of the satellite (or payload on board the satellite) that is less than the number of tiles covered when operating in the "High On" mode.

When a satellite 102 (or individual payload on board a satellite 102) is operated in the "Low On" mode, a subset of the service providing elements on the satellite 102 (or payload on board the satellite 102) that is less than the service providing elements turned on during the "Medium On" mode may be turned on to provide the coverage and these elements, collectively, may consume power at an average (or estimated) rate of CC W, which is less than the rate of BB W and provide a relatively low level of coverage within the footprint of the satellite (or payload on board the satellite) that is less than the level of coverage when the satellite (or payload on board the satellite) is operated in the "Medium On" mode. For example, when operating in the "Low On" mode, the satellite (or the payload on board the satellite), may provide a relatively low number of receive and/or transmit beams within the footprint of the satellite (or the payload on the satellite) that is less than the number of beams that the satellite (or payload on board the satellite) provides when operating in the "Medium On" mode. Consequently, the satellite (or the payload on board the satellite) may provide coverage to a relatively low number of tiles within the footprint of the satellite (or payload on board the satellite) that is less than the number of tiles covered when operating in the "Medium On" mode.

When operated in one of the above-described "On" modes, a satellite 102 (or payload on board the satellite 102) may be referred to as being in a "functioning" mode (e.g., because the satellite 102 (or payload) is capable of providing service).

When a satellite 102 (or individual payload on board a satellite 102) is operated in the "High Idle" mode, all of the service providing elements may be turned off and the satellite 102 (or payload), thus, may provide no coverage. Nevertheless, while the satellite 102 (or payload) is operated in the "High Idle" mode, other circuitry and/or components on board the satellite 102 (or payload) may still be on and consuming energy at the average (or estimated) rate of XX W, which is less than the rate of CC W. For example, in some implementations, one or more Field Programmable Gate Arrays (FPGAs) may be on board a satellite 102 (or payload) (e.g., to provide signal processing functions). In such implementations, one or more FPGAs may remain powered on while the satellite 102 (or payload) is operated in the "High Idle" mode such that the FPGA(s) consumes power at an average (or estimated) rate of XX W. The "High Idle" mode may be referred to as a reduced power mode.

When a satellite 102 (or individual payload on board a satellite 102) is operated in the "Low Idle" mode, all of the service providing elements and a significant amount of other circuitry and/or components (e.g., FPGAs) may be turned off. In this mode, the satellite 102 (or payload) may consume power at an average (or estimated) rate of YY W, which is less than XX W, for instance, to keep the system critical circuitry and/or componentry on, such as, for example, the system timer, hardware setting, etc. In some implementations, the "Low Idle" mode may be the "off" mode but with the system critical circuitry on, such that the satellite may be remotely turned on. When operated in the "High Idle" mode or the "Low Idle" mode, a satellite 102 (or payload on board the satellite 102) may be referred to as being in a "nonfunctioning" mode (e.g., because the satellite 102 (or payload) is not capable of providing service).

In another implementation, the satellites 102 (or individual payloads on board of the satellites 102) in the constellation may not necessarily be configured to operate within the same set of different modes having the same average (or estimated) power consumption levels. For example, a first subset of the satellites 102 (or payloads on board the first subset of satellites 102) in the constellation may be configured to operate in the modes depicted in Table 1, but another subset of the satellites 102 (or payloads on board the second subset of satellites 102) in the constellation may be configured to operate in three modes: "On" with an average (or estimated) power consumption rate of AA1 W; "High Idle" with an average (or estimated) power consumption rate of XX1 W, which is less than a rate of AA1 W; and "Idle" or "Off" with an average (or estimated) power consumption rate of YY1 W, which is less than a rate of XX1 W.

Regardless of whether the satellites 102 (or individual payloads on board the satellites 102) in the constellation are configured to operate in the same modes, the satellite information repository 202 may store power consumption information for the different operational modes of all satellites 102 (or payloads on board the satellites 102) in the constellation. Each symbol referenced above in connection with power consumption levels, e.g., "AA," "BB," "CC," "XX," "YY," "AA1," "XX1," and "YY1," may represent a numerical value of a power consumption rate, which, for example, may be obtained by circuit design data or as empirical data among other approaches. It should be appreciated that at least one or more satellites (or payloads or board such satellites) in one implementation may have two "on" modes or more than three "on" modes and the respective power consumption level for each "on" mode may be used for the satellite (or payload) coverage provisioning process accordingly.

The computing apparatus 204 may provision the satellite coverage based on the information in the satellite information repository 202 and/or other information. In provisioning the satellite coverage, certain constraints (or other factors) may be taken into account. For example, a first time-related constraint may be that the total power consumption by an individual satellite 102 (or payload on board the individual satellite 102) during a defined sliding time window of length $T_w$ be less than some first defined maximum amount, and a second time-related constraint may be that the total power consumption by the satellite (or payload on board the satellite) during an eclipse period be less than some second defined maximum amount. In some implementations, the sliding window of time ($T_w$) may be the same duration as the satellite orbit period (e.g., ~100 minutes for a satellite at an 800 km altitude). In one implementation, the computing apparatus 204 may provision the satellite coverage according to a greedy algorithm that seeks to minimize the power consumption for each individual satellite 102 (or a payload on board each individual satellite) rather than focusing on the total power consumption of the satellites 102 (or payloads on board the satellites) in the constellation in the aggregate.

Figure 3:
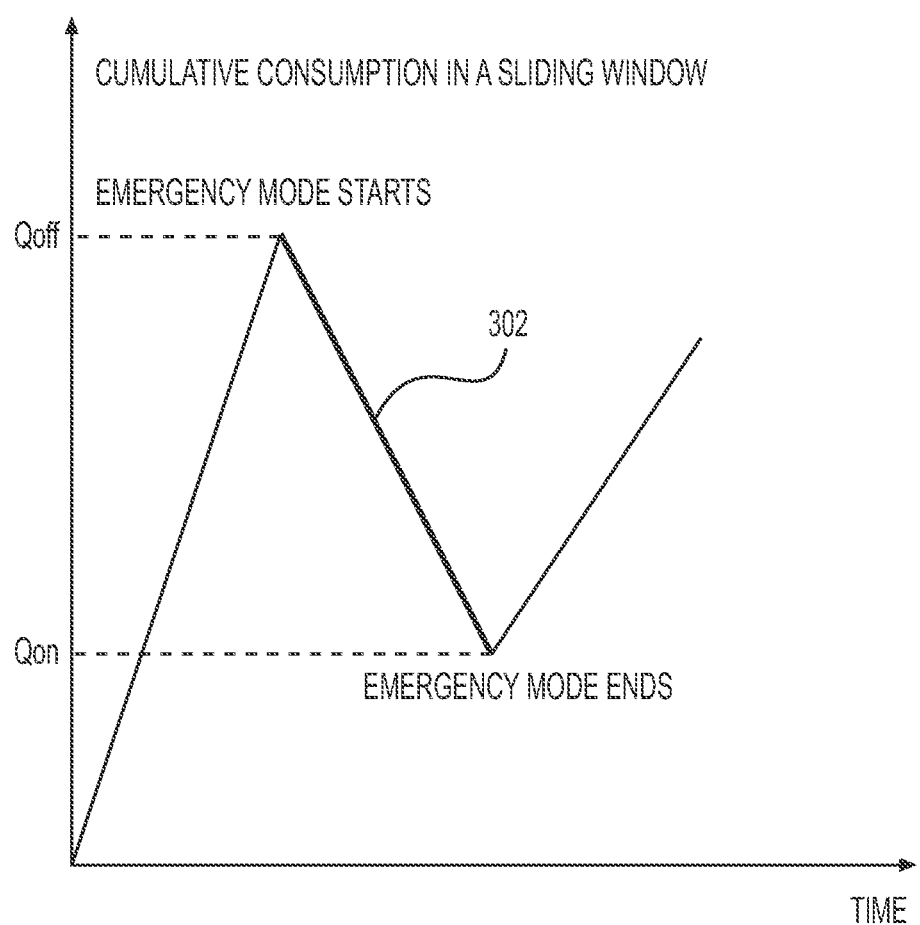
FIG. 3 is a schematic diagram of hysteresis for cumulative power consumption.

Additionally or alternatively, irrespective of other factors, the computing apparatus 204 may determine to turn an individual satellite 102 (or payload on board the individual satellite 102) off (e.g., put it into a "High Idle" or "Low Idle" mode) in response to determining (i) that the total cumulative power consumption by the satellite (or payload on board the satellite) at any point during a defined time period (e.g., $T_w$) will or has exceeded a defined power consumption threshold level, or (ii) the total cumulative power consumption by the satellite 102 (or payload on board the satellite 102) during an eclipse period will or has exceeded a defined eclipse period power consumption threshold level. An example of how an individual satellite (or payload on board a satellite) may be powered on and off (e.g., switched between a functional mode and a non-functional mode) according to a power consumption constraint is shown in FIG. 3, which illustrates a hysteresis for cumulative power consumption during a sliding window of time (e.g., $T_w$) for a satellite (or payload on board the satellite) according to an implementation. As shown in FIG. 3, a cumulative power consumption curve 302 may represent the (actual or projected) cumulative power consumption for one satellite (or a payload on board the satellite) over sliding window period $T_w$. Two cumulative power consumption threshold values may be defined: $Q_{off}$ and $Q_{on}$. The threshold values $Q_{off}$ and $Q_{on}$ may not be absolute values; instead, they may represent threshold values within a sliding time window of the length $T_w$. The threshold $Q_{off}$ may designate a cumulative power consumption value during the period $T_w$ that, if reached (or projected to be reached) by the satellite (or payload on board the satellite) causes the satellite (or payload on board the satellite) to be turned off, e.g., transitioning the satellite (or payload on board the satellite) into the "High Idle" or "Low Idle" mode. In some implementations, the power consumption in the "High Idle" mode may be too large to give any benefit when and if an emergency hits. Therefore, in these implementations, the satellite (or payload on board the satellite) may be transitioned to the "Low Idle" mode when $Q_{off}$ is exceeded (or projected to be exceeded) during $T_w$, and the "Low Idle" mode may be referred to as an "emergency mode" or "minimal energy consumption" mode. In the case where a satellite (or payload on board the satellite) has been placed in a lower power mode such as an "emergency mode," the satellite (or payload on board the satellite) can be restored to a higher power mode (e.g., one of the "High On," "Medium On," "Low On," or "High Idle" modes) in response to the cumulative power consumption within the sliding time window falling (or projected to fall) to a cumulative power consumption threshold $Q_{on}$ that is less than the cumulative power consumption threshold $Q_{off}$. It should be appreciated that FIG. 3 shows an example of a situation in which a satellite (or payload on board a satellite) turns on, keeps consuming power until its cumulative power consumption within a sliding window of time hits $Q_{off}$ and is turned off (or turned to a reduced power consumption mode), but, after some time, its cumulative power consumption during the sliding window of time goes down and falls to $Q_{on}$ and is turned on again (or returned to a higher power consumption mode) in response. In various scenarios, however, the (actual or projected) cumulative power consumption curve of a satellite (or a payload on the satellite) may go up and down between the two threshold values $Q_{off}$ and $Q_{on}$ over time without necessarily reaching either threshold value.

Having two cumulative power consumption threshold values $Q_{off}$ and $Q_{on}$, respectively, essentially provides hysteresis that prevents the satellite (or payload on board the satellite) from frequently toggling between higher and lower power consumption modes. For example, if a satellite (or payload on board a satellite) is in a higher power consumption mode over a significant period of time, it is possible the cumulative power consumed within the sliding time window at some point may exceed (or be projected to exceed) the threshold $Q_{off}$, causing the satellite (or payload on board the satellite) to enter a lower power consumption mode. Once in the lower power consumption mode, the cumulative power consumed during the sliding time window may diminish below the cumulative power consumption threshold $Q_{off}$, but the satellite (or payload on board the satellite) may not be restored to a higher power consumption mode until the cumulative power consumed (or projected to be consumed) during the sliding time window diminishes to the lower cumulative power consumption threshold $Q_{on}$. Thereafter, the satellite (or payload on board the satellite) may then remain in the higher power consumption mode until the cumulative power consumed (or projected to be consumed)

during the sliding time window again exceeds (or is projected to exceed) the higher cumulative power consumption threshold $Q_{off}$.

In some implementations, the hysteresis for cumulative power consumption shown in FIG. 3 may not be employed when a satellite is in an eclipse period. In one implementation, if a satellite (or payload on board the satellite) is put into an emergency mode during an eclipse period, the satellite (or the payload on board the satellite) may be retained in the emergency mode until the eclipse period ends.

In an effort to keep the power consumption of an individual satellite (or payload on board the satellite) as low as possible, the computing apparatus 204 may implement features as follows:

1) Keep track of the cumulative power consumption (e.g., actual or projected) in a current sliding time window (the cumulative eclipse power consumption may be tracked separately) and turn the satellite (or payload on board the satellite) to the "Low Idle" mode in response to detecting that the satellite (or the payload on board the satellite) has hit (or is projected to hit) its emergency threshold.
2) While the satellite (or payload on board the satellite) is operating in an operational mode, aggressively try to switch the satellite (or payload on board the satellite) to a lower power consumption mode (e.g., the "High Idle" mode) whenever the satellite (or payload on board the satellite) does not provide critical coverage to any tile within its footprint (or any tiles expected to be within its footprint during a defined period of time). For example, if all of the tiles within the satellite's (or payload's) footprint (or expected to be within its footprint during a defined period of time) are more than critically covered, the satellite(s) (or payload(s) on board the satellite(s)) with larger cumulative power consumption (or projected power consumption) and/or eclipse power consumption may be switched to the "High Idle" mode.
3) After the satellite (or the payload on board the satellite) has operated in the "High Idle" mode for a defined period of time, switch the satellite (or payload on board the satellite) to the "Low Idle" mode.

Additionally or alternatively, in some implementations, a periodic or aperiodic reboot of the satellite (or the payload on board the satellite) may be planned as part of the satellite (or payload) provisioning process. This may be provided, for example, to satisfy a satellite (or payload) requirement, which may require a reboot at least once per orbit period (e.g., to support thermal dissipation). In some implementations, the reboot may be performed when the satellite is in a non-functional mode. In at least one implementation, the provisioning process may define a maximal waiting time for the satellite (or payload on board the satellite) since the last time the satellite (or payload on board the satellite) was operated in a non-functional mode ($T_{wait}$), and switch the satellite (or payload on board the satellite) to a non-functional mode at least once after (or during) such maximal waiting time.

Figure 4:
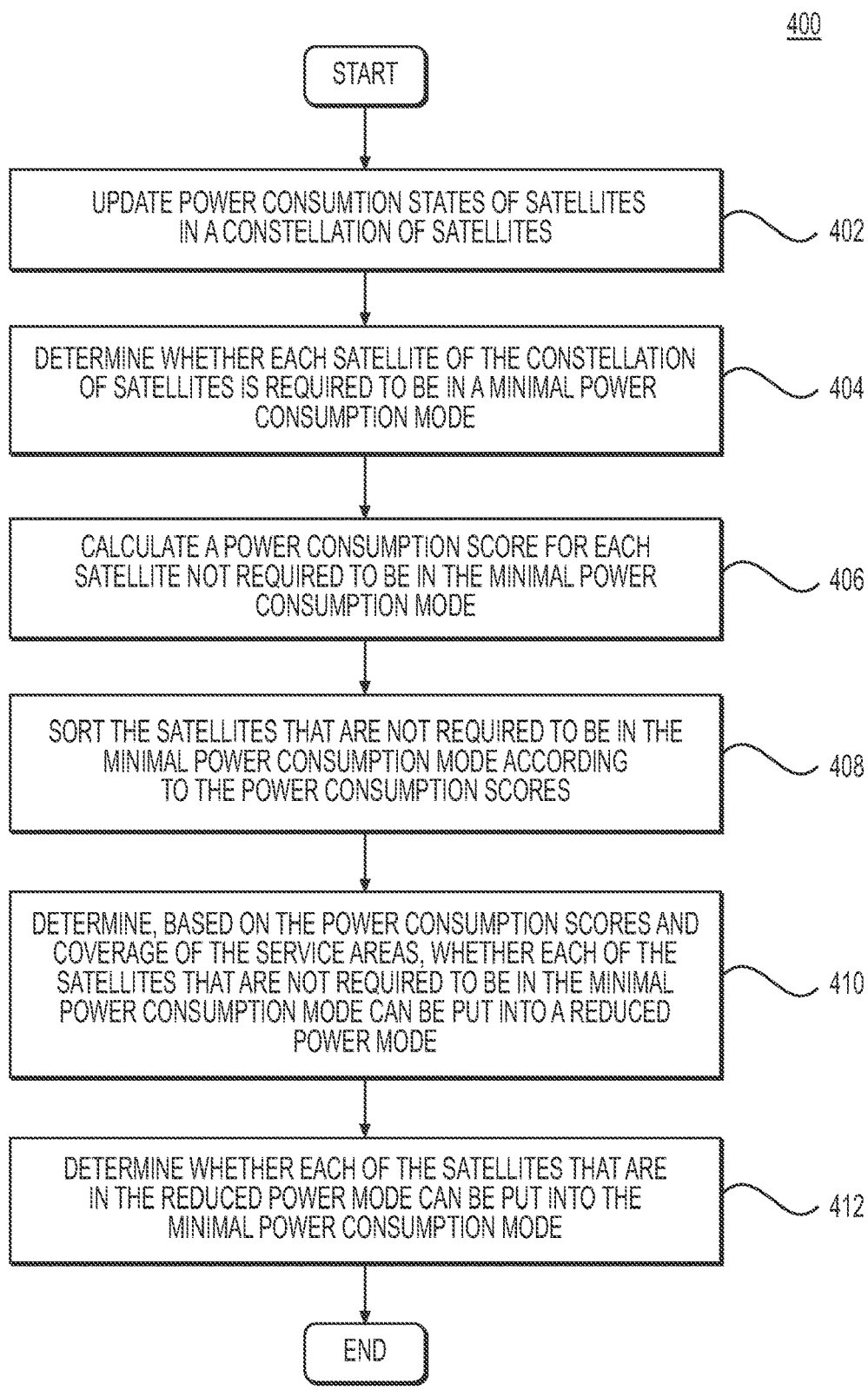
FIG. 4 is a flow diagram of an exemplary satellite coverage provisioning process.

FIG. 4 illustrates a flow diagram of an exemplary satellite coverage provisioning process 400 according to an implementation of the present disclosure. In some implementations, the process may be performed by or in conjunction with a computing apparatus such as, for example, computing apparatus 204 of FIG. 2 and/or a computing apparatus on board a satellite. The satellite coverage provisioning process 400 may start at block 402, at which power consumption states for satellites (or payloads on board the satellites) within a constellation of satellites may be updated. In some implementations, information about the power consumption states of the satellites (or payloads on board the satellites) may be stored in a satellite information repository, such as, for example, satellite information repository 202. The power consumption state of each satellite (or a payload on the satellite) may include without limitation the satellite's (or payload's) current power consumption information, historical power level information (e.g., cumulative power consumption during a sliding window of time), current operational mode, and/or projected future power consumption.

At block 404, whether each satellite (or a payload on each satellite) of the constellation of satellites is required to be in a minimal energy consumption mode (e.g., the "Low Idle" mode) may be determined, for example, based on the updated power consumption state of the satellite (or the payload on board the satellite) and/or other factors. For example, it may be determined whether the cumulative power consumption of the satellite (or a payload on board the satellite) during a sliding window of time exceeds a first threshold value and/or whether the cumulative power consumption of the satellite (or a payload on the satellite) during an eclipse period exceeds a second threshold value. In some implementations, this determination may be based, at least in part, on projected future power consumption. For example, if the projected future power consumption of the satellite (or a payload on board the satellite) during a defined future time period suggests that the cumulative power consumption of the satellite (or payload on board the satellite) during a sliding window of time that includes at least a portion of the defined future time period will exceed a defined threshold value, a determination may be made that the satellite (or payload on board the satellite) is required to be in a minimal energy consumption mode. Each satellite (or payload on board the satellite) determined to be required to be in a minimal energy consumption mode then may be controlled to be transitioned to the minimal energy consumption mode. For example, a signal may be sent to the satellite (or the payload on the satellite) instructing the satellite to transition to the minimal energy consumption mode.

At block 406, for each satellite of the constellation of satellites (or a payload on each satellite of the constellation of satellites) that is not required to be in the minimal power consumption mode, a power consumption score may be calculated. The power consumption score may be a numerical value representing how close the satellite's (or payload's) cumulative power consumption in a sliding time window is to a limit (e.g., the maximal allowable power consumption during the sliding time window). In some implementations, the power consumption score for a satellite (or payload on board the satellite) may be based on historic power consumption by the satellite (or payload on board the satellite). Additionally or alternatively, in some implementations, the power consumption score for a satellite (or payload on board the satellite) may be based, at least in part, on projected future power consumption by the satellite (or payload on board the satellite). In one implementation, a satellite (or a payload on board the satellite) having a higher power consumption score may be closer to the maximal allowable cumulative power consumption threshold than a satellite (or payload on board the satellite) having a lower power consumption score. As described herein, in some implementations, the power consumption score may be calculated by taking into consideration whether the satellite (or payload on board the satellite) is in an eclipse period. Moreover, in some implementations, inputs used in calculating the power consumption score for a satellite (or a payload on board the satellite) may be retrieved from a satellite information repository, such as, for example, satellite information repository 202 of FIG. 2.

At block 408, the satellites (or payloads on the satellites) that are not required to be in the minimal power consumption mode may be sorted according to their respective power consumption scores. At block 410, the satellite coverage provisioning process 400 may determine, based on respective power consumption scores of the satellites (or payloads on the satellites) and coverage of the service area, whether each of the satellites (or payloads on board the satellites) that are not required to be in the minimal power consumption mode can be put into a reduced power mode (e.g., the "High Idle" mode). For example, in some implementations, starting with the satellite (or payload on the satellite) closest to the maximal power consumption threshold, a determination may be made, based on the current operational modes of the satellites in the constellation and other information stored in the satellite information repository 202 (e.g., satellite (or payload) ephemeris), as to whether all of the tiles in the footprint of the satellite (or payload on board the satellite) (or expected to be within the footprint of the satellite (or payload on board the satellite) within a defined period of time) requiring coverage are (or will be) critically covered or more than critically covered. If the result is affirmative and transitioning the satellite (or payload on board the satellite) to a reduced power mode will not result in any of the tiles requiring coverage dropping below a critical coverage level, it may be determined to transition the satellite (or payload on board the satellite) to a reduced power mode. This determination thereafter may be repeated in order for each of the satellites (or payloads on board the satellites) in the sorted list. As described above, in some implementations, the satellites (or payloads on board the satellites) may be configured to operate in one of multiple different functional modes (e.g., "High On," "Medium On," and "Low On"). In such implementations, a particular functional mode for each satellite (or payload on board the satellite) not determined to be switched into the reduced power mode may be determined, for instance, based on the consumption score and coverage of the service areas. For example, a higher power consumption mode may be selected for a satellite (or payload on board the satellite) when the power consumption score is relatively low and/or the required coverage of the service area is relatively high than when the power consumption score is relatively high and/or the required coverage of the service area is relatively low.

At block 412, whether each satellite (or payload on board the satellite) of the constellation of satellites that is in a reduced power mode (e.g., the "High Idle" mode) can be put into a minimal energy consumption (e.g., the "Low Idle" mode) mode may be determined. In some implementations, it may be determined that a satellite (or payload on board the satellite) can be put into the minimal energy consumption mode after the satellite (or payload on board the satellite) has been assigned to the reduced power mode for some defined number of consecutive schedule slots. The satellites (or payloads on the satellites) for which determinations were made to transition to different operating modes (e.g., into the "High Idle" or "Low Idle" modes) then may be instructed to be transitioned to the appropriate operating modes. For example, signals may be sent to each satellite (or the payload on the satellite) instructing the satellite to transition to the appropriate operating mode. Additionally or alternatively, in some implementations, process 400 may be performed in advance in order to generate a provisioning schedule for each satellite that then is uploaded to each satellite, for example, via uplinks 206. For example, future provisioning schedules for each satellite may be generated more than twenty-four hours (or more) out. These provisioning schedules (or portions of these provisioning schedules) then may be uploaded to each satellite. In some implementations, each schedule slot (e.g., possible new operational state) may be 30 seconds, and new provisioning schedules may be uploaded to the satellites every 120 seconds (or, in some implementations, more or less frequently). Each individual satellite then may adjust its operating mode in accordance with the appropriate provisioning schedule.

An exemplary satellite coverage provisioning process according to the present disclosure may implement a greedy algorithm that seeks to minimize power consumption of individual satellites (or payloads on individual satellites) instead of global power consumption across the constellation in the aggregate. In one implementation, the greedy algorithm may be implemented as a repeating loop with an incremental time step $\Delta t_s$. This incremental time step $\Delta t_s$ and examples of a number of other configuration parameters, which may be stored, for example, in satellite information repository 202 or otherwise accessible by computing apparatus 204, are listed in Table 2 below.

TABLE 2

Exemplary Configuration Parameters for Satellite Coverage Provisioning

| Parameter | Description |
| --- | --- |
| $\Delta t_s$ | Calculation incremental time step |
| $P_{High}$ | Power consumption level in "High On" mode |
| $P_{Medium}$ | Power consumption level in "Medium On" mode |
| $P_{Low}$ | Power consumption level in "Low On" mode |
| $P_{aver}$ | Average power consumption level when not in "High Idle" or "Low Idle" mode |
| $P_{high.idle}$ | Power consumption level in "High Idle" mode |
| $P_{idle}$ | Power consumption level in "Low Idle" mode |
| $T_w$ | Sliding window of time from $(t - T_w)$ to t, where t is the current time (the time being scheduled). |
| $Q_{off}$ | Emergency threshold for cumulative power consumption in $T_w$ |
| $Q_{on}$ | Cumulative power consumption in $T_w$ threshold for coming out of the emergency mode, $Q_{on} < Q_{off}$ |
| $Q_{max.eclipse}$ | Emergency cumulative power consumption threshold during eclipse period |
| $T_{idle}$ | Minimum time satellite (or payload on satellite) remains in "Low Idle" mode after transitioning into "Low Idle", in minutes |
| $T_{wait}$ | Minimum time since satellite (or payload on satellite) was last in "Low Idle" mode before satellite (or payload on satellite) can return to "Low Idle" mode, in minutes |
| $T_{reboot}$ | Maximal waiting time since the last reboot, in minutes |
| $\alpha$ | Weighting parameter for scoring power consumption during an eclipse period |

Most parameters in Table 2 have been explained above and/or will be explained in detail below. The quantities measured in Watts may be denoted as P with a respective subscript and the quantities measured in Watt-minutes as Q with a respective subscript.

As described above, in some implementations, service requirements may dictate a reboot (e.g., of the satellite, a payload on board the satellite, and/or certain componentry on board the satellite or on a payload) at least once per orbit (e.g., to support thermal dissipation). Thermal dissipation may be particularly applicable for FPGAs and other electronics in space due to accumulation of cosmic radiation and its impact on gate logic and signal processing while in operation. Thus, in addition to the other features already explained above, at least one reboot of the satellite (or payload on board the satellite) per orbit may be planned as part of the satellite coverage provisioning process. As indicated by the parameter $T_{reboot}$ in Table 2, the maximal waiting time since the last reboot may be defined. In some implementations, the reboot may be done whenever the satellite (or payload on board the satellite) is in the "Low Idle" (or "High Idle") mode (e.g., upon the satellite (or payload on board the satellite) transitioning into the "Low Idle" (or "High Idle") mode). In at least one implementation, the satellite coverage provisioning process may define a maximal waiting time since the last "Low Idle" (or "High Idle") mode ($T_{reboot}$) and reboot a satellite (or payload on board the satellite) at least once after (or during) such maximal waiting time. In other words, if the configured time period $T_{reboot}$ elapses without the satellite (or payload on board the satellite) having been rebooted, the satellite coverage provisioning process may cause the satellite (or payload on board the satellite) to enter the "Low Idle" (or "High Idle") mode and reboot. Alternatively, in some implementations, if the configured time period $T_{reboot}$ elapses without the satellite (or payload on board the satellite) having been rebooted, the satellite coverage provisioning process may schedule the satellite (or payload on board the satellite) to enter the "Low Idle" (or "High Idle") mode and reboot at the next opportunity determined to be convenient to do so.

In addition to the configuration parameters listed in Table 2, examples of information about the current and previous states of the satellites (or payloads on board the satellites) and other information potentially relevant to the satellite coverage provisioning, which may be stored, for example, in satellite information repository 202 or otherwise accessible by computing apparatus 204, are listed in Table 3 below.

TABLE 3

Exemplary Information Stored Per Satellite (or Payload On Board Satellite) for Satellite Coverage Provisioning Process

| Parameter | Description |
|---|---|
| $Q_{total}$ | Cumulative power consumption during the sliding window, initialized to zero |
| $C_i$ | Array of power consumption data with $T_w/\Delta t_s$ entries, $C_0$ corresponds to the most recent step, $C_1$ to the previous one etc. Initialized to zero. |
| $Q_{eclipse}$ | Cumulative power consumption since beginning of an eclipse period, initialized to zero |
| EMERGENCY | Flag whether the satellite is in the emergency mode. |
| ECLIPSE | Flag whether the satellite is in an eclipse period. It may be set externally based on the ephemerides |
| $t_{eclipse.left}$ | If the satellite is in an eclipse period, the time until the end of the current eclipse period, otherwise undefined. |
| M | Current operational mode |
| $M_p$ | Previous operational mode |
| $t_{on}$ | Last time satellite (or payload on board satellite) came off a "High Idle" operational mode, in minutes |
| S | Power consumption score |

The quantities related to power in Table 3 may be measured in either Watt-minutes or average Watts, as long as the choice is the same for the actual consumption and the threshold values.

As described above, power consumption scores (denoted as S in Table 3) may be calculated for individual satellites (or payloads on board the satellites). In one implementation, when a satellite (or payload on board the satellite) is not in an eclipse period, the power consumption score for the satellite (or payload on board the satellite) may be calculated as a ratio of the cumulative power consumption $Q_{total}$ in the sliding window ($T_w$) to the maximal (e.g., emergency) energy consumption threshold $Q_{off}$.

$$S = Q_{total}/Q_{off} \quad (1)$$

In some implementations, when a satellite (or payload on board the satellite) is in an eclipse period, its cumulative power consumption until the end of the eclipse period is desired to be less than a maximal defined value during the eclipse period, which may be the configuration parameter "Emergency cumulative power consumption threshold during eclipse period" denoted as $Q_{max.eclipse}$ in Table 2. If the satellite (or payload on board the satellite) remains in one of the "on" modes until the end of the eclipse period, its cumulative power consumption during the eclipse period may be equal to the cumulative power consumption since the beginning of the eclipse period (e.g., $Q_{eclipse}$ in Table 3) plus future spending (e.g., $t_{eclipse.left}$ multiplied by a power consumption rate P, where $t_{eclipse.left}$ has been defined in Table 3 and P may be one of $P_{High}$, $P_{Medium}$, or $P_{Low}$ as defined in Table 2). The time $t_{eclipse.left}$ may be calculated based on the satellite's orbit, travel scheduling information and the Sun's position, any or all of which, for example, may be stored in satellite information repository 202 or otherwise available to computing apparatus 204. In one implementation, the average energy consumption $P_{aver}$ may be used for P. A power deficiency variable $Q_{deficiency}$ may be calculated as:

$$Q_{deficiency} = (Q_{eclipse} + t_{eclipse.left}P)Q_{max.eclipse} \quad (2)$$

As for calculating the power consumption score of a satellite (or a payload on board the satellite) in an eclipse period, a ratio of this deficiency to $Q_{max.eclipse}$ may be calculated as:

$$S_{eclipse} = \begin{cases} 0, & Q_{deficiency} \leq 0 \\ Q_{deficiency}/Q_{max.eclipse}, & Q_{deficiency} > 0 \end{cases} \quad (3)$$

Then the power consumption score for the satellite (or a payload on board the satellite) with eclipse adjustment may be calculated as:

$$S = \begin{cases} S_{normal}, & \text{Not in eclipse} \\ S_{normal} + \alpha S_{eclipse}, & \text{In eclipse} \end{cases} \quad (4)$$

The parameter $\alpha$ in the equation (4) may represent the importance of the eclipse constraint. For example, by increasing the parameter $\alpha$, the exemplary satellite coverage provisioning process may be more aggressive in switching off satellites (or payloads on board the satellites) in eclipse periods. In some implementations, the parameter $\alpha$ may be determined based on simulation. In one non-limiting implementation, the parameter $\alpha$ may be selected as $\alpha \approx 0.1$. Other values for $\alpha$ may also be used in different implementations.

Figure 5:
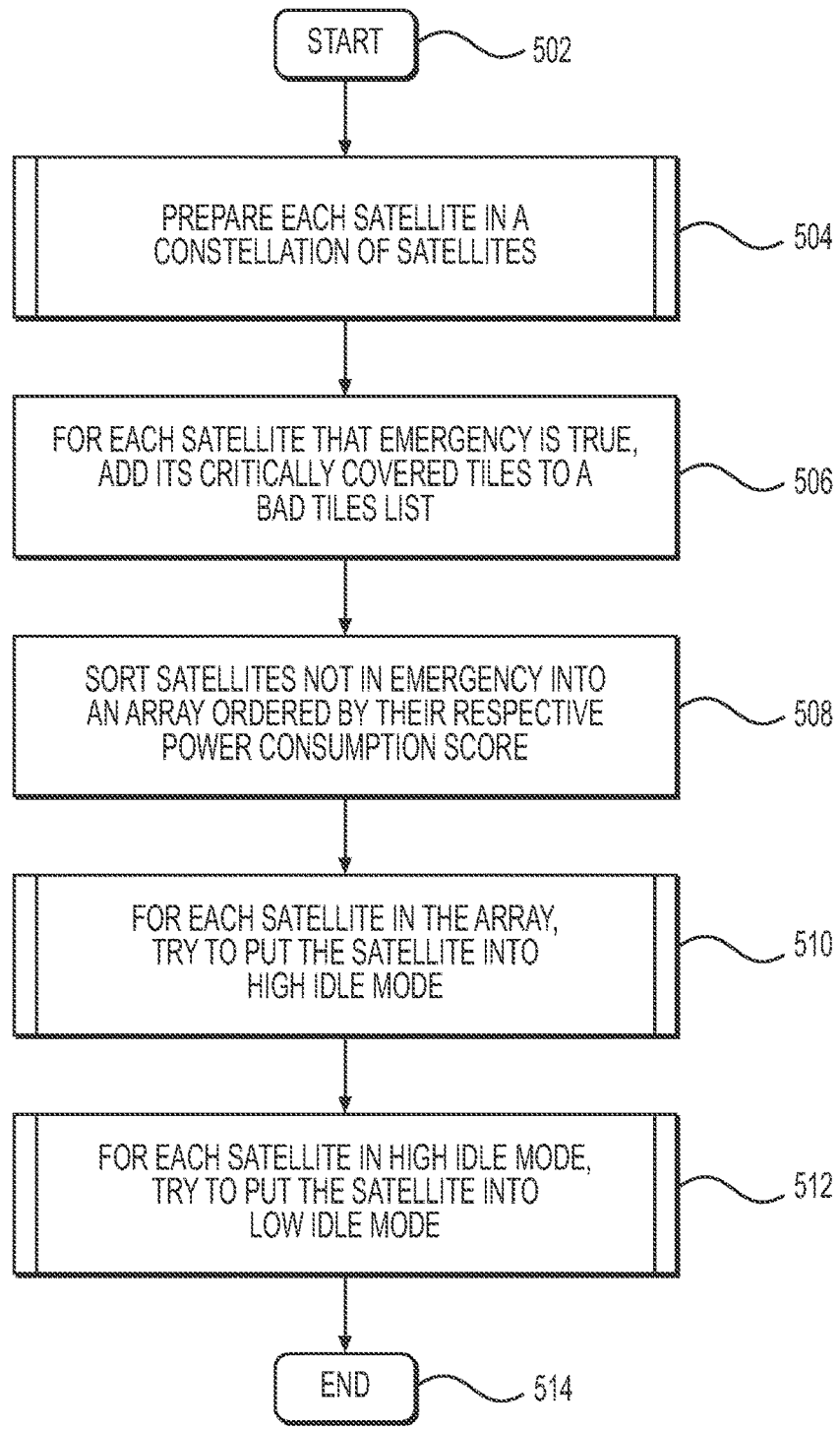
FIG. 5 is a flow diagram of an exemplary iteration of a loop for satellite coverage provisioning.

FIG. 5 illustrates an exemplary iteration 500 of a loop for satellite coverage provisioning using a constellation of satellites (or payloads on board a constellation of satellites). In some implementations, the iteration 500 may be performed by or in conjunction with a computing apparatus such as, for example, computing apparatus 204 of FIG. 2 and/or a computing apparatus on board a satellite. The iteration 500 may be performed for each satellite (or a payload on board each satellite) for an incremental time step $\Delta t_s$. One example $\Delta t_s$ may be a value between 5-30 s depending on the orbital altitude/velocity and the desired accuracy of the coverage information. The iteration 500 may start at 502. At operation 504, the iteration 500 may prepare each satellite (or payload on board each satellite) in the constellation of satellites. In one implementation, the operation 504 may include, for each of the satellites (or a payload on board each of the satellites) in the constellation, updating stored information about the current and/or past operational modes of the satellite (or payload on board the satellite), updating stored information about the current and/or past power consumption of the satellite (or payload on board the satellite), checking whether to remain in or enter emergency mode, and (if not in or entering emergency mode) calculating the power consumption score. In some implementations, as part of operation 504, satellites (or payloads on board the satellites) for which it is determined to enter the emergency mode may be scheduled or instructed to enter the emergency mode. As described herein, a power consumption score for each satellite (or a payload on board each satellite) may be calculated with consideration of whether the satellite (or payload on board the satellite) is in an eclipse period. One exemplary implementation of the operation 504 may be a subroutine or sub-process which may be invoked by the iteration 500. A flowchart illustrating such a sub-process is shown in FIG. 6 and will be described below.

At operation 506, for each satellite (or payload) that is in emergency mode (e.g., its EMERGENCY variable being true), the critically covered tiles by such a satellite (or payload) during a defined future time period (e.g., $\Delta t_s$) while the satellite (or payload) remains in emergency mode may be added to a bad tiles list. As described above, a tile is critically covered if the number of satellites (or payloads) providing coverage of the tile is equal to the required number to provide the coverage. If a satellite (or payload on board the satellite) is in emergency mode, its service providing elements are turned off and thus, the satellite (or payload on board the satellite) cannot provide coverage. Therefore, any tiles being critically covered with coverage provided by the satellite (or payload on board the satellite) while the satellite (or payload) is in emergency mode is now not sufficiently covered. The bad tiles list may be used to keep track of tiles that have either no coverage or a shortage in the required or desired coverage. Ephemeris data for each satellite (or payload on board the satellite) (e.g., the projected orbit and corresponding footprint of the satellite (or payload) during the future time period) may be used in identifying bad tiles during the future time period.

Figure 8:
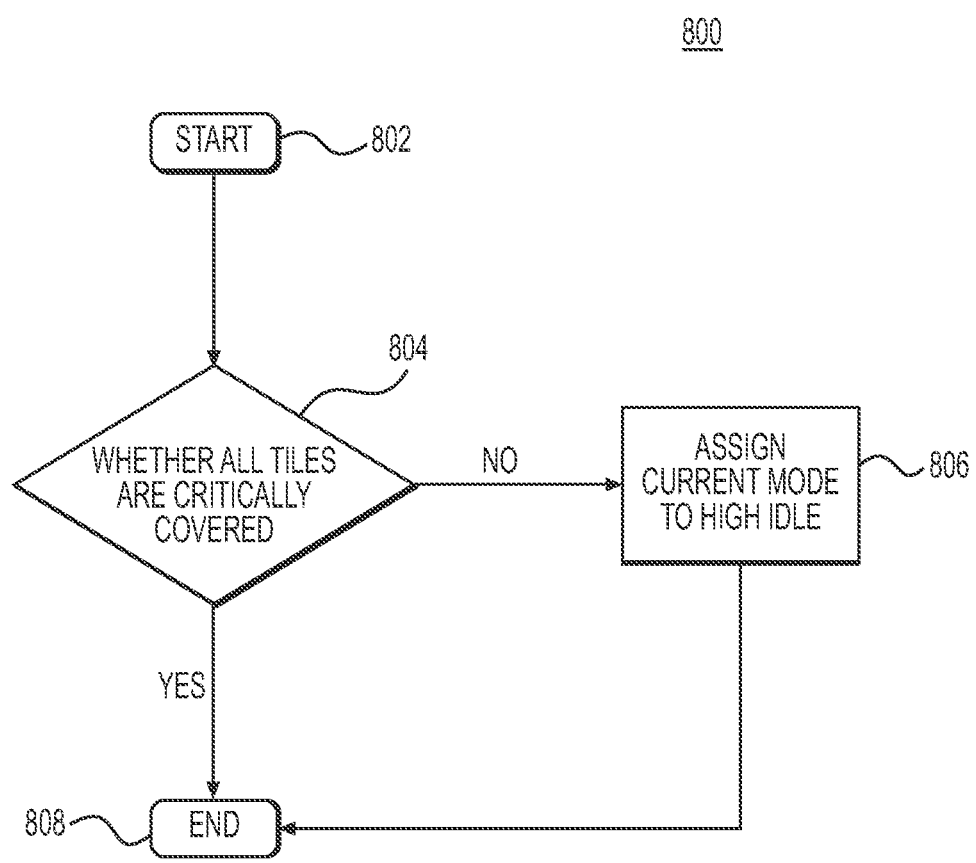
FIG. 8 is a flow diagram of an exemplary process for determining whether a satellite may be put into a "High Idle" power level.
Figure 9:
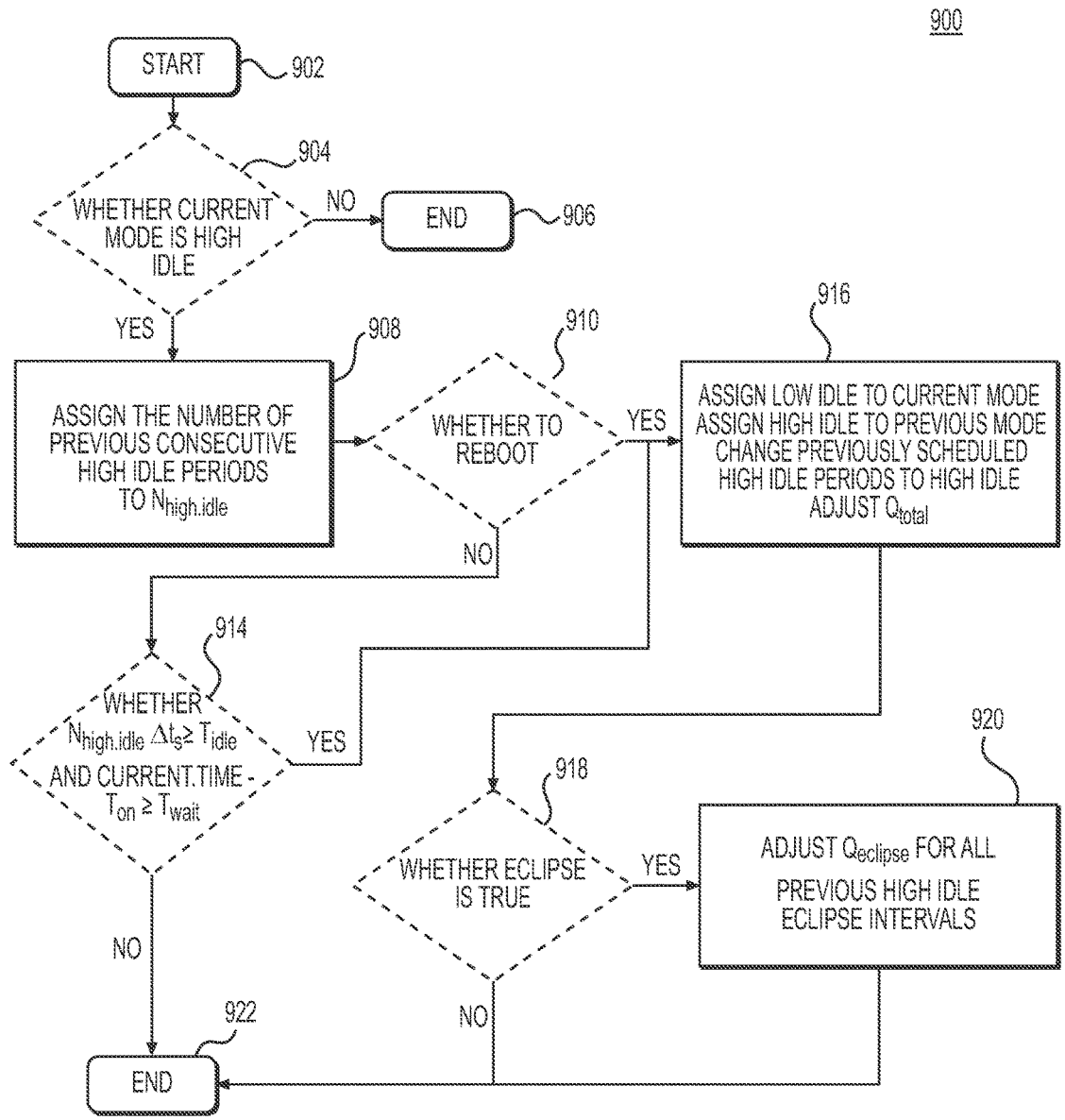
FIG. 9 is a flow diagram of an exemplary process for determining whether a satellite may be put into a "Low Idle" power level.

At operation 508, the iteration 500 may sort satellites (or payloads on board the satellites) not determined to remain in or enter the emergency mode (e.g., in operation 504) into an array (e.g., denoted N) ordered by their respective power consumption scores. The power consumption scores may have been calculated as part of the sub-process for preparation of each satellite in operation 504. In one implementation, the satellites (or payloads on board the satellites) may be arranged in the array in a descending order such that, in the next two operations, the satellites (or payloads on board the satellites) having higher power consumption scores may be processed earlier than those having lower power consumption scores. In some cases, two or more satellites (or payloads on board the satellites) may have equal power consumption scores. In such cases, satellites (or payloads on board the satellites) may be sorted first based on their power consumption scores and then based on one more additional attributes. At operation 510, the iteration 500 may iterate through the satellites (or payloads on board the satellites) in the array and determine whether each satellite (or payload on board the satellite) may be put into "High Idle" mode. Satellites (or payloads on board the satellites) for which it is determined to enter the "High Idle" mode may be instructed or scheduled to enter the "High Idle" mode. At operation 512, the iteration 500 may iterate through the satellites (or payloads on board the satellites) that already have been determined to be in or to enter the "High Idle" mode and determine whether each such satellite (or payload on board the satellite) may be put into "Low Idle" mode. Satellites (or payloads on board the satellites) for which it is determined to enter the "Low Idle" mode may be instructed or scheduled to enter the "Low Idle" mode. Each of operation 510 and operation 512 may be implemented in a subroutine or sub-process which may be invoked by the iteration 500. A flowchart illustrating a sub-process for operation 510 is shown in FIG. 8 and a flowchart illustrating a sub-process for operation 512 is shown in FIG. 9. According to at least one implementation of the satellite coverage provisioning process, the higher the energy consumption score, the more urgent it is to switch off the satellite.

Figure 6:
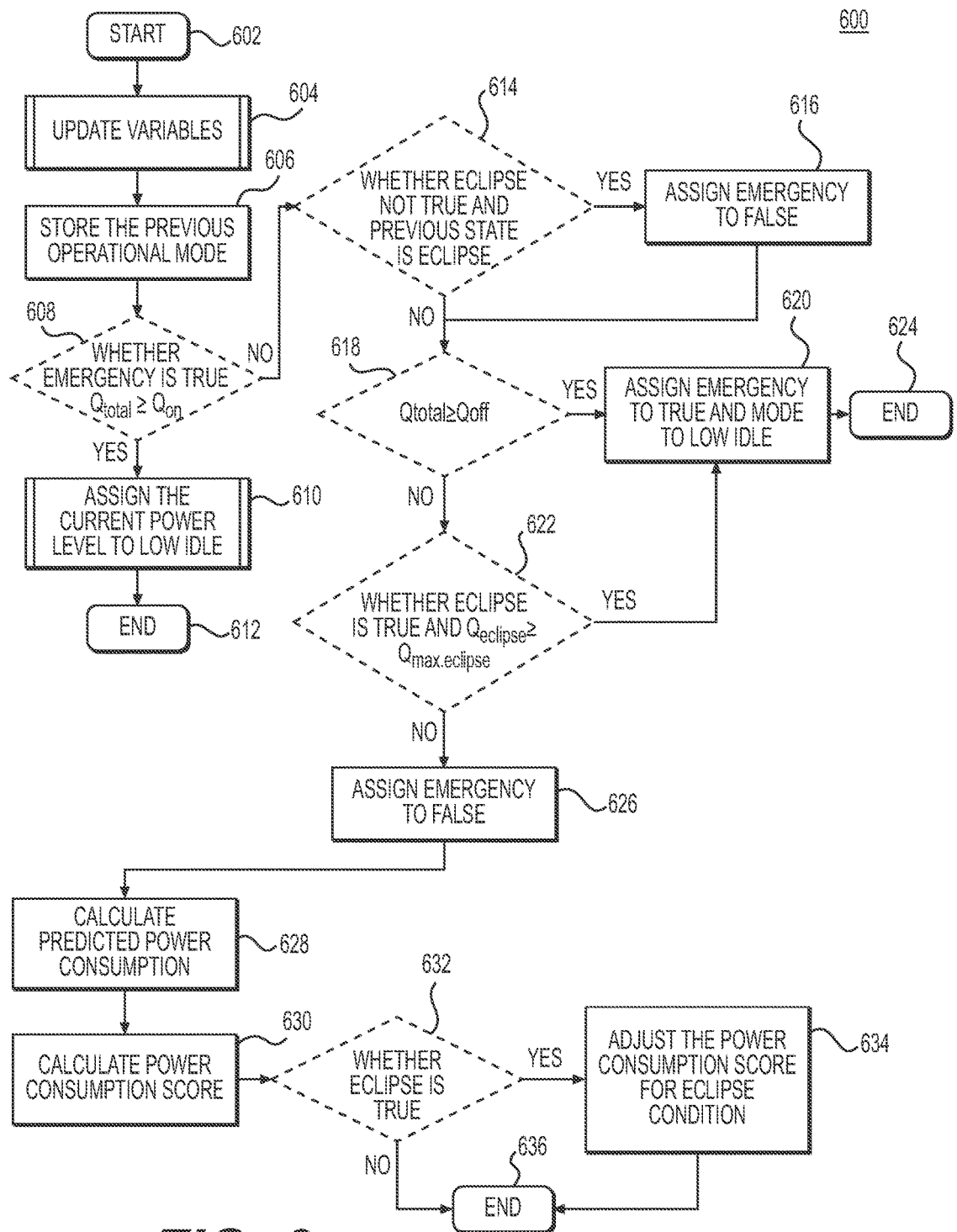
FIG. 6 is a flow diagram of an exemplary process for preparing each satellite.
Figure 7:
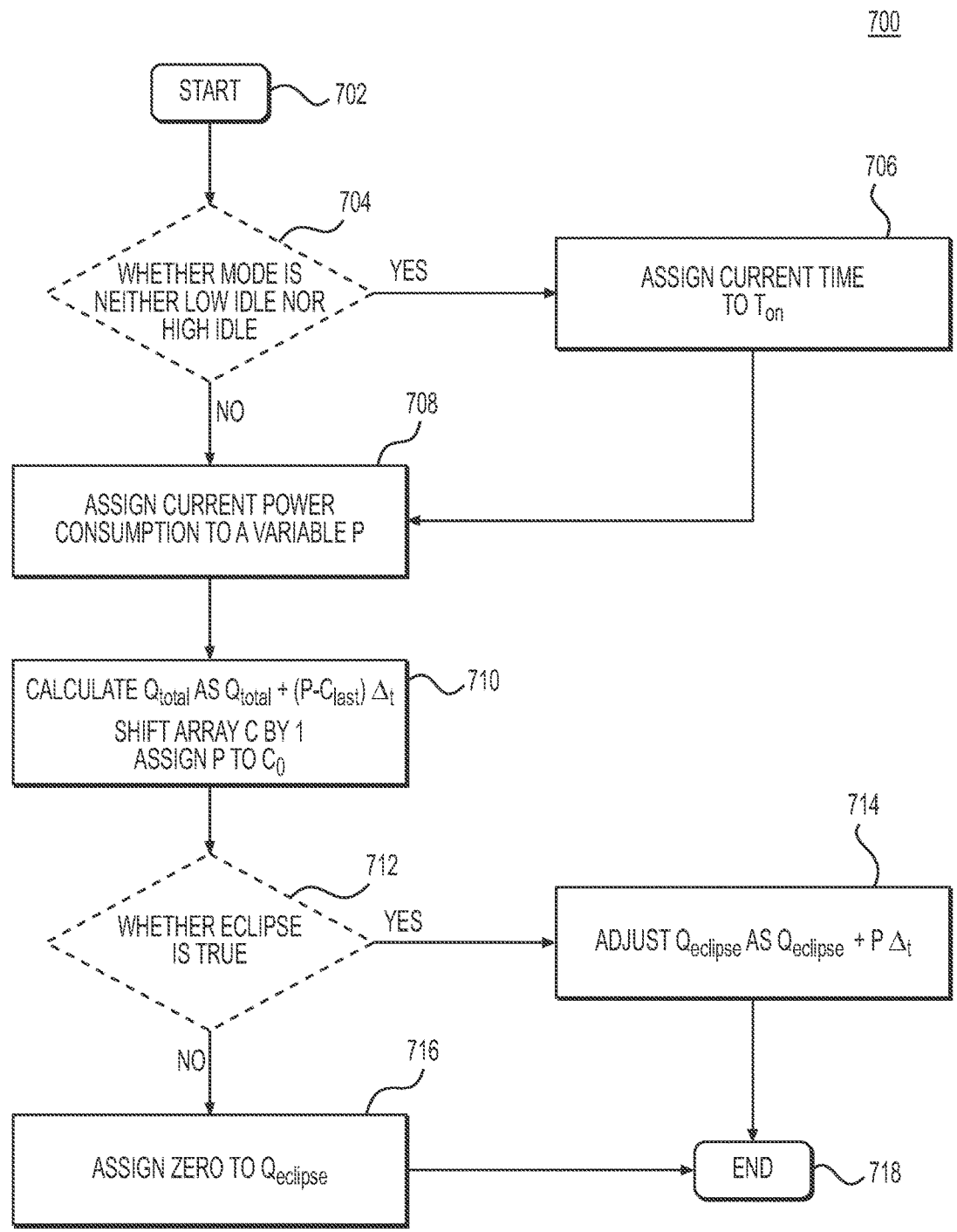
FIG. 7 is a flow diagram of an exemplary process for updating status of each satellite.

FIG. 6 illustrates an exemplary sub-process 600 for preparing each satellite (or a payload on board each satellite). In one implementation, the sub-process 600 may be invoked at operation 504 at least once for each satellite (or a payload on board each satellite) in the constellation of satellites separately. The sub-process 600 may start at 602. At operation 604, the sub-process 600 may update variables for the satellite (or a payload on board the satellite) currently being processed. One exemplary implementation of the operation 604 may be implemented in a subroutine or sub-process which may be invoked at operation 604. A flowchart illustrating such a sub-process is shown in FIG. 7 and will be described below.

At operation 606, the previous operational mode for the satellite (or payload on board the satellite) currently being processed may be stored. As indicated in Table 3, a current operational mode may be denoted as M and a previous operational mode may be denoted as $M_p$ ("current" may be in the sense of being processed, not necessarily the operational mode contemporaneous with execution of the operation 606). Thus, for example, operation 606 may be implemented as an assignment, such as $M_p$=M in some common programming languages (e.g., C/C++, Java, FORTRAN, etc.). At operation 608, whether the EMERGENCY variable is true and whether $Q_{total}$ is larger than or equal to $Q_{on}$ may be determined. If both conditions are true, the sub-process 600 may proceed to block 610, at which the current operational mode may be assigned to "Low Idle," and then the sub-process 600 may end at block 612. (Unless indicated otherwise, the "end" blocks in FIGS. 6-9 may be implemented as a "return" in many common programming languages). In one implementation, operation 610 may be used to continue the emergency mode for the satellite (or payload on board the satellite) currently under processing. In some implementations, after a determination is made that a satellite (or payload on board a satellite) should stay in or enter the "Low Idle" mode, the satellite (or payload on board the satellite) may be instructed or scheduled to stay in or enter the "Low Idle" mode accordingly. If either or both conditions "EMERGENCY variable is true" or "$Q_{total}$ is larger than or equal to $Q_{on}$" are not true, the sub-process 600 may proceed to block 614, at which whether the ECLIPSE variable is true and whether the previous state is eclipse may be determined. If both conditions are true in block 614, the sub-process 600 may proceed to block 616, at which the EMERGENCY flag may be cleared. In one implementation, the operation 616 may be used to indicate that the satellite (or payload on board the satellite) currently being processed is coming out of an eclipse period. If either or both conditions are false in block 614, or alternatively, after the operation 616, the sub-process 600 may proceed to block 618, at which whether $Q_{total}$ is larger than or equal to $Q_{off}$ may be determined. If $Q_{total}$ is larger than or equal to $Q_{off}$, the sub sub-process 600 may proceed to block 620, at which the satellite (or payload on board the satellite) may be put into the "Low Idle" mode for energy consumption and its EMERGENCY variable set as true. From block 620, the sub-process 600 may end at block 624. If, however, $Q_{total}$ is less than $Q_{off}$, the sub-process 600 may proceed to block 622, at which whether ECLIPSE is true and $Q_{eclipse}$ is larger than or equal to $Q_{max.eclipse}$ may be determined. If ECLIPSE is true and $Q_{eclipse}$ is larger than or equal to $Q_{max.eclipse}$, the sub-process 600 may proceed to block 620. If ECLIPSE is not true, $Q_{eclipse}$ is less than $Q_{max.eclipse}$, or both, the sub-process 600 may proceed to block 626, at which the EMERGENCY variable may be assigned to false. Operation 626 may indicate that the satellite (or payload on board the satellite) currently being processed is not in the emergency mode, if the sub-process 600 reaches this block.

From block 626, the sub-process 600 may proceed to block 628, at which the predicted cumulative power consumption for the satellite (or payload on board the satellite) may be calculated. As described above, the predicted cumulative power consumption may be calculated based on the operational modes of the satellite (or payload on board the satellite) and predicted time periods in the different operational modes. At least in one implementation, this calculation may use the average power $P_{aver}$ to calculate the predicted cumulative power consumption. Regardless of whether using specific power for the specific power modes (e.g., $P_{High}$, $P_{Medium}$, or $P_{Low}$) or using the average power $P_{aver}$, this operation 626 may be implemented in a separate subroutine or sub-process in some implementations.

From block 628, the sub-process 600 may proceed to block 630, at which the power consumption score may be calculated (e.g., using equation (1) and the predicted cumulative power consumption). At block 632, whether ECLIPSE is true may be determined. If the satellite (or payload on board the satellite) currently being processed is in an eclipse period, the result of operation 632 may be "YES," and the sub-process 600 may proceed to block 634. At 634, the power consumption score may be adjusted for the eclipse condition. As described above, the power deficiency variable $Q_{deficiency}$ may be calculated according to equation (2) and the predicted cumulative power consumption, then a scoring parameter for eclipse $S_{eclipse}$ as a ratio of this deficiency to $Q_{max.eclipse}$ may be calculated according to equation (3), and the total power consumption score adjusted for eclipse may be calculated according to equation (4). From block 634, the sub-process 600 may proceed to block 636 and end. If the satellite (or payload on board the satellite) currently being processed is not in an eclipse period, the result of operation 632 may be "NO," and the sub-process 600 may also proceed to block 636 and end.

FIG. 7 illustrates an exemplary sub-process 700 for updating the operational status of each satellite (or a payload on board each satellite). In one implementation, the sub-process 700 may be invoked at operation 604. The sub-process 700 may start at block 702. At block 704, whether the current operational mode is neither "Low Idle" nor "High Idle" may be determined. If operation 704 returns "YES," the sub-process 700 may proceed to 706, at which the current time may be assigned to the variable $t_{on}$. This operation may represent storing the time that the satellite leaves the idle mode. If operation 704 returns "NO," or the operation at block 706 has finished, the sub-process 700 may proceed to block 708, at which a current power consumption level may be assigned to a variable P (e.g., based on the operational mode of the satellite (or payload on board the satellite). For example, if the satellite (or payload on board the satellite) is in (or during the time period $\Delta t_s$ will be in) one of the operational modes, the variable P may be assigned a value of $P_{High}$, $P_{Medium}$, or $P_{Low}$ as appropriate given the operational mode of the satellite (or payload on board the satellite). Alternatively, if the satellite (or payload on board the satellite) is in (or during the time period $\Delta t_s$ will be in) one of the operational modes, the variable P may be assigned a value of $P_{aver}$. Then at block 710, the cumulative power consumption $Q_{total}$ may be calculated as a previous value of $Q_{total}$ plus (P–$C_{last}$) multiplied by $\Delta t_s$, the array C may be shifted by one, and the value of the variable P may be assigned to $C_0$. This process associated with array C creates the "sliding window" effect in an iterative way by updating $Q_{total}$. At block 712, whether the satellite (or payload on board the satellite) is in an eclipse period may be determined by checking whether the ECLIPSE variable is true. If the satellite (or payload on board the satellite) is in an eclipse period, the cumulative power consumption since the beginning of the eclipse $Q_{eclipse}$ may be updated at block 714 to account for the power consumed during the incremental time step $\Delta t_s$ such that $Q_{eclipse}=Q_{eclipse}+P\times\Delta t_s$, and the sub-process 700 may end at block 718. If the satellite (or payload on board the satellite) is not in an eclipse period, the power consumption since the beginning of the eclipse period $Q_{eclipse}$ may be set to zero at block 716, and the sub-process 700 may end at block 718.

FIG. 8 illustrates an exemplary sub-process 800 for determining whether a satellite (or a payload on board the satellite) (e.g., a satellite (or a payload on board the satellite) not in emergency mode) may be put into a "High Idle" operational mode. In one implementation, the sub-process 800 may be invoked at operation 510. The sub-process 800 may start at block 802. At block 804, whether all tiles covered by the satellite (or payload on board the satellite) currently being processed are critically covered (or will be critically covered during a future time period (e.g., $\Delta t_s$) may be determined. If operation at block 804 returns "YES," that means the satellite (or payload on board the satellite) currently being processed provides (or will provide) redundant coverage for tiles it covers and thus, the satellite (or payload on board the satellite) currently being processed may be put to "High Idle" mode at block 806. That is, the satellite (or payload on board the satellite) currently being processed may be configured to stop the coverage. If operation at block 804 returns "NO," or alternatively, after the block 806, the sub-process 800 may end at block 808.

FIG. 9 illustrates an exemplary sub-process 900 for determining whether a satellite (or payload on board the satellite) (e.g., a satellite (or a payload on board the satellite) that is scheduled for "High Idle" mode) may be put into the "Low Idle" operational mode. In one implementation, the sub-process 900 may be invoked at operation 512. The sub-process 900 may start at block 902. At block 904, whether the current mode for the satellite (or payload on board the satellite) currently being processed is in "High Idle" mode may be determined. If operation at block 904 returns "NO," the sub-process 900 may end at block 906. If operation at block 904 returns "YES," the sub-process 900 may proceed to block 908, at which the number of previous consecutive "High Idle" periods may be assigned to a variable $N_{high.idle}$. Each previous "High Idle" period may be for an incremental time step $\Delta t_s$.

Then at block 910, whether to reboot the satellite (or payload on board the satellite) currently being processed may be determined. As described above, certain services may require a satellite (or a payload on board the satellite) to be rebooted during a certain period of time, such as one orbit, for example. In one implementation, the condition for determining whether to reboot may be whether the current time $T_{current.time}$ minus the last time the satellite (or payload on board the satellite) came off Low Idle mode $T_{on}$ is larger than a pre-defined maximal waiting time value since the last reboot $T_{reboot}$ (e.g., checking whether $T_{current.time}-T_{on}>T_{reboot}$). If operation 910 returns "NO," at block 914, whether the length of time the satellite (or payload on board the satellite) has remained in consecutive "High Idle" periods is larger than an idle time threshold value $T_{idle}$ and whether $T_{current.time}-T_{on}>T_{wait}$ may be determined. If operation 914 returns "NO," the sub-process 900 may end at block 922. It should be noted that the sequence of blocks 910 and 914 is irrelevant and, in some implementations, they may be in a different order or even combined (e.g., both blocks combined into one conditional operation). If either of the operations 910 or 914 returns "YES," the sub-process 900 may proceed to block 916, at which the satellite (or payload on board the satellite) currently being processed may be put into the "Low Idle" mode. At block 916, "Low Idle" may be assigned as the current operational mode, "High Idle" may be assigned as the previous operational mode, previously scheduled upcoming "High Idle" periods may be changed to "Low Idle" periods, and the total scheduled energy consumption $Q_{total}$ may be adjusted to account for the change to "Low Idle" as well. With the previously scheduled $N_{high.idle}$ "High Idle" periods changed to be "Low Idle" periods, the $N_{high.idle}$ entries in the array C may be changed to $P_{idle}$ at block 916 as well. In at least one implementation, the adjustment to $Q_{total}$ may be performed as $Q_{total}=Q_{total}-N_{high.idle}(P_{high.idle}-P_{idle})\Delta t_s$. It should be noted that, in some implementations, the satellite coverage provisioning process described herein may be performed beforehand. That is, this process may not be executed in real time such that every decision may not be carried out immediately, but instead this process may be pre-performed such as to prepare a schedule for the future. Thus, previously scheduled "High Idle" periods may be adjusted to be "Low Idle" periods and this adjustment may not affect the satellite's current operation. Additionally or alternatively, in some implementations, the satellite coverage provisioning process may be repeatedly iteratively such that periods previously scheduled for the satellite (or payload on board the satellite) may be changed during successive iterations.

From block 916, the sub-process 900 may proceed to block 918, at which whether the satellite (or payload on board the satellite) currently being processed is in an eclipse period is determined. If operation 918 determines that the ECLIPSE is true, at block 920, the power consumption for eclipse $Q_{eclipse}$ may be adjusted for all previously scheduled "High Idle" eclipse intervals to account for the change to "Low Idle." In one implementation, such an adjustment may be performed by repeating the calculation $Q_{eclipse}=Q_{eclipse}-(P_{high.idle}-P_{idle})\Delta t_s$ for all consecutive pervious states in ECLIPSE and "High Idle" mode. If operation 918 returns "NO," or alternatively, the block 920 finishes, the sub-process 900 may end at block 922.

Figure 10:
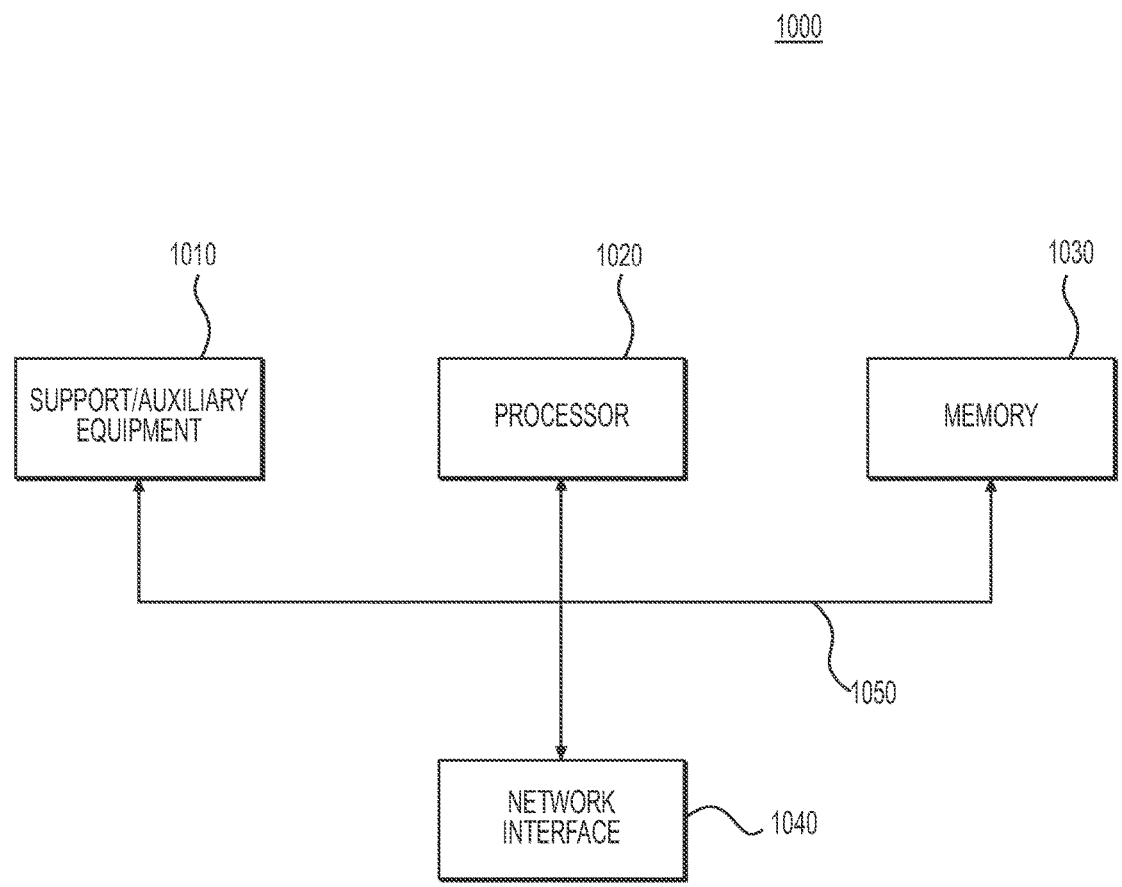
FIG. 10 is a block diagram demonstrating an exemplary computing apparatus configured to execute satellite coverage provisioning.

FIG. 10 illustrates an exemplary system configuration suitable to practice aspects of the present disclosure. As illustrated in the figure, an exemplary computing apparatus 1000 may include a processor 1020, memory 1030, support/auxiliary equipment 1010 and network interface 1040 communicatively coupled one to another through interconnect equipment 1050. Interconnect equipment 1050 includes interface, control and processing circuitry sufficient to facilitate information exchange between components of computing apparatus 1000. It is to be understood that while interconnect equipment 1050 is illustrated in FIG. 10 as a single bus, interconnect equipment 1050 may include multiple, different signal-bearing media and may implement multiple, different interconnect hardware configurations, media access, signaling, pathfinding and/or routing techniques, communication protocols, etc. Computing apparatus 1000 may represent an implementation of computing apparatus 204 of FIG. 2.

Processor 1020 may be constructed or otherwise configured to, among other things, execute processing instructions that implement various functional modules and all processes as described herein, such as those described herein with reference to FIGS. 2 and 4-9. It is to be understood that the present disclosure is not limited to a particular hardware configuration or instruction set architecture of processor 1020, which may be configured by numerous structures that perform equivalently to those illustrated and described herein. Moreover, it is to be understood that while the processor 1020 is illustrated as a single component, certain implementations may include distributed processing implementations through multiple processing elements. Processor 1050 may be realized through a wide variety of processing and interface circuitry including, but not limited to analog-to-digital converter circuits, digital-to-analog converter circuits, fixed digital logic circuits, programmable digital logic circuits, application specific circuits, etc., to implement, among other components, general data processors, data-specific processors, signal converters and conditioners, analog and digital signal processors, and so on. Those having skill in the art will recognize numerous processing configurations by which the present disclosure can be embodied without departing from the spirit and intended scope thereof.

Memory 1030 may be utilized to store data and processing instructions on behalf of the exemplary computing apparatus 1000. Memory 1030 may include memory that is distributed across components, to include, among others, cache memory and pipeline memory. Memory 1030 may include persistent memory, such as one or more hard disk drives, or may be implemented in multiple persistent memory devices, which may be interconnected by a communication network, such as to implement one or more databases. Memory 1030 may include electrical, magnetic and/or optical storage media and associated access mechanisms including, but not limited to electronic random access and/or read-only memory, flash memory, hard disk drive memory, compact disk memory and digital versatile disk memory to implement, among other things, executable code storage, application data storage, instruction and data registers, and instruction and data caches.

Network interface 1040 may include network cards and modules for communication with satellites (or payloads on board the satellites) and/or data storage devices, such as, for example, the satellite information repository 202 of FIG. 2 (e.g., if the satellite information repository 202 is not co-located with the apparatus 1000). In certain implementations, such characterization is modeled for purposes of controlling the constellation of satellites for service coverage provisioning, as discussed in detail herein. Communication operations implemented by network interface 1040 may include network communications, e.g., Ethernet, Wi-Fi, cellular, etc., and serial communications, e.g., Universal Serial Bus (USB), RS-232, etc. Implementations are not limited to any particular communication media, signal type or protocol; those having skill in the art will recognize numerous communication techniques that can be used without departing from the spirit and intended scope of the concepts disclosed herein.

Support/auxiliary equipment 1010 may include input/output circuits including a display, a keyboard, a mouse, a track ball, a stylus, a touch screen, a touchpad, and/or other devices suitable to provide input to the computing apparatus 1000.

Certain aspects of the present general concepts disclosed herein provide for functional components to manufactured, transported, marketed and/or sold as processor instructions encoded on computer-readable media. Implementations, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but are not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concepts, for example, as exemplified by the implementations described above.

The descriptions above are intended to illustrate possible implementations of the present concepts and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. Furthermore, though certain constraints and determinations are described herein as being based on power consumption, such constraints and determinations could equally well be based on electrical energy consumption such that the terms power consumption and electrical energy consumption may be understood to encompass one another herein. The scope of the disclosure should therefore be determined not with reference to the description above, but with reference to the appended claims, along with their full range of equivalents.

What is claimed is:

1. A method of provisioning satellite coverage for a service area, the method comprising:
   updating power consumption states for satellites in a constellation of satellites;
   determining whether each satellite of the constellation of satellites is required to be in a minimal power consumption mode based on its updated power consumption state;
   scheduling each satellite required to be in the minimal power consumption mode to enter the minimal power consumption mode;
   for satellites that are not required to be in the minimal power consumption mode, calculating a power consumption score representing a power consumption level relative to a limit;
   sorting the satellites that are not required to be in the minimal power consumption mode according to their power consumption scores;
   determining, based on the sorted order, whether at least some of the satellites that are not required to be in the minimal power consumption mode can be put into a reduced power consumption mode based on the satellite's power consumption score and coverage of the service area;
   scheduling each satellite that can be put into the reduced power consumption mode to enter the reduced power consumption mode;
   determining whether each of the satellites that are in the reduced power consumption mode can be put into the minimal power consumption mode; and
   scheduling each satellite that is in the reduced power consumption mode that can be put into the minimal power consumption mode to enter the minimal power consumption mode.

2. The method of claim 1, wherein sorting the satellites comprises sorting the satellites according to the power consumption score in a descending order.

3. The method of claim 1, wherein calculating the power consumption score comprises:
   calculating the power consumption score as a ratio of power consumption $Q_{total}$ in sliding window of time to a maximal cumulative power consumption threshold $Q_{off}$: $S=Q_{total}/Q_{off}$.

4. The method of claim 3, further comprising, when a satellite is in an eclipse period, adjusting its power consumption score by a ratio of a power deficiency variable $Q_{deficiency}$ to an emergency threshold for eclipse power consumption $Q_{max.eclipse}$ when $Q_{deficiency}$ is larger than zero.

5. The method of claim 4, wherein the adjustment is performed by a factor multiplied to the ratio of $Q_{deficiency}/Q_{max.eclipse}$.

6. The method of claim 1, further comprising:
   determining a time to reboot a satellite when the satellite is in the minimal power consumption mode.

7. The method of claim 1, further comprising:
   determining a satellite needs to be put into the minimal power consumption mode when the satellite's total cumulative power consumption will exceed a threshold at any time during a sliding window.

8. A computing apparatus comprising:
   one or more network interfaces for connection to a constellation of satellites;
   a memory; and
   a processor coupled to the one or more network interfaces and the memory, and configured to:
     update power consumption states for satellites in a constellation of satellites;
     determine whether each satellite of the constellation of satellites is required to be in a minimal power consumption mode based on its updated power consumption state;
     schedule each satellite required to be in the minimal power consumption mode to enter the minimal power consumption mode;
     for satellites that are not required to be in the minimal power consumption mode, calculate a power consumption score representing a power consumption level relative to a limit;

sort the satellites that are not required to be in the minimal power consumption mode according to their power consumption scores;

determine, based on the sorted order, whether at least some of the satellites that are not required to be in the minimal power consumption mode can be put into a reduced power consumption mode based on the satellite's power consumption score and coverage of the service area;

schedule each satellite that can be put into the reduced power consumption mode to enter the reduced power consumption mode;

determine whether each of the satellites that are in the reduced power consumption mode can be put into the minimal power consumption mode; and schedule each satellite that is in the reduced power consumption mode that can be put into the minimal power consumption mode to enter the minimal power consumption mode.

9. The apparatus of claim 8, wherein to sort the satellites that are not in the minimal power consumption mode the processor is further configured to sort the satellites according to the power consumption score in a descending order.

10. The apparatus of claim 8, wherein to calculate the power consumption score the processor is further configured to:

calculate the power consumption score as a ratio of cumulative power consumption in a sliding window of time to a maximal power consumption threshold $Q_{off}$: $S=Q_{total}/Q_{off}$.

11. The apparatus of claim 10, wherein the processor is further configured to, when a satellite is in an eclipse period, adjust its power consumption score by a ratio of a power deficiency variable $Q_{deficiency}$ to an emergency threshold for eclipse power consumption $Q_{max.eclipse}$ when $Q_{deficiency}$ is larger than zero, wherein the adjustment is performed by a factor multiplied to the ratio of $Q_{deficiency}/Q_{max.eclipse}$.

12. The apparatus of claim 8, wherein the processor is further configured to:

determine a time to reboot a satellite when the satellite is in the minimal power consumption mode.

13. The apparatus of claim 8, wherein the processor is further configured to:

determine a satellite needs to be put into the minimal power consumption mode when the satellite's total cumulative power consumption will exceed a threshold at any time during a sliding window.

14. One or more non-transitory computer readable storage media having instructions encoded thereon that, when executed by a processor, cause the processor to:

update power consumption states for satellites in a constellation of satellites;

determine whether each satellite of the constellation of satellites is required to be in a minimal power consumption mode based on its updated power consumption state;

schedule each satellite required to be in the minimal power consumption mode to enter the minimal power consumption mode;

for satellites that are not required to be in the minimal power consumption mode, calculate a power consumption score representing a power consumption level relative to a limit;

sort the satellites that are not required to be in the minimal power consumption mode according to their power consumption scores;

determine, based on the sorted order, whether at least some of the satellites that are not required to be in the minimal power consumption mode can be put into a reduced power consumption mode based on the satellite's power consumption score and coverage of the service area;

schedule each satellite that can be put into the reduced power consumption mode to enter the reduced power consumption mode;

determine whether each of the satellites that are in the reduced power consumption mode can be put into the minimal power consumption mode; and schedule each satellite that is in the reduced power consumption mode that can be put into the minimal power consumption mode to enter the minimal power consumption mode.

15. The non-transitory computer readable storage media of claim 14 having additional instructions encoded thereon that, when executed by the processor, cause the processor to:

sort the satellites that are not in the minimal power consumption mode by sorting the satellites according to the power consumption score in a descending order.

16. The non-transitory computer readable storage media of claim 14 having additional instructions encoded thereon that, when executed by the processor, cause the processor to calculate the power consumption score by calculating the power consumption score as a ratio of cumulative power consumption in a sliding window of time to a maximal power consumption threshold $Q_{off}$: $S=Q_{total}/Q_{off}$.

17. The non-transitory computer readable storage media of claim 16 having additional instructions encoded thereon that, when executed by the processor, cause the processor to, when a satellite is in an eclipse period, adjust its power consumption score by a ratio of a power deficiency variable $Q_{deficiency}$ to an emergency threshold for eclipse power consumption $Q_{max.eclipse}$ when $Q_{deficiency}$ is larger than zero.

18. The non-transitory computer readable storage media of claim 17, wherein the adjustment is performed by a factor multiplied to the ratio of $Q_{deficiency}/Q_{max.eclipse}$.

19. The non-transitory computer readable storage media of claim 14, having additional instructions encoded thereon that, when executed by the processor, cause the processor to:

determine a time to reboot a satellite when the satellite is in the minimal power consumption mode.

20. The non-transitory computer readable storage media of claim 14, having additional instructions encoded thereon that, when executed by the processor, cause the processor to:

determine a satellite needs to be put into the minimal power consumption mode when the satellite's total cumulative power consumption will exceed a threshold at any time during a sliding window.

* * * * *